United States Patent
Aubry et al.

(10) Patent No.: US 11,408,723 B2
(45) Date of Patent: Aug. 9, 2022

(54) METHOD AND SYSTEMS FOR THE NON-INVASIVE OPTICAL CHARACTERIZATION OF A HETEROGENEOUS MEDIUM

(71) Applicants: Centre National de la Recherche Scientifique, Paris (FR); ECOLE SUPÉRIEURE DE PHYSIQUE ET DE CHIMIE INDUSTRIELLES DE LA VILLE DE PARIS, Paris (FR)

(72) Inventors: Alexandre Aubry, Ivry-sur-Seine (FR); Amaury Badon, Brookline, MA (US); Victor Barolle, Saint Cloud (FR); Claude Boccara, Paris (FR); Laura Cobus, Paris (FR); Mathias Fink, Meudon (FR); William Lambert, Paris (FR)

(73) Assignees: Centre National de la Recherche Scientifique, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 0 days.

(21) Appl. No.: 17/261,439

(22) PCT Filed: Jul. 16, 2019

(86) PCT No.: PCT/EP2019/069158
§ 371 (c)(1),
(2) Date: Jan. 19, 2021

(87) PCT Pub. No.: WO2020/016249
PCT Pub. Date: Jan. 23, 2020

(65) Prior Publication Data
US 2021/0310787 A1    Oct. 7, 2021

(30) Foreign Application Priority Data

Jul. 19, 2018    (FR) .................................. 1856725

(51) Int. Cl.
*G01B 11/02* (2006.01)
*G01B 9/02055* (2022.01)
(Continued)

(52) U.S. Cl.
CPC ...... *G01B 9/02075* (2013.01); *G01B 9/02091* (2013.01); *G01N 21/4795* (2013.01); *G02B 21/365* (2013.01); *G02B 27/0025* (2013.01)

(58) Field of Classification Search
CPC ........... G01B 9/02075; G01B 9/02091; G01B 9/02007; G01N 21/4795; G02B 21/365; G02B 27/0025; G01J 2009/0269
See application file for complete search history.

(56) References Cited

U.S. PATENT DOCUMENTS

2004/0061867 A1    4/2004  Dubois et al.
2016/0061725 A1*   3/2016  Choi ................. G01B 9/02091
                                                    356/497

FOREIGN PATENT DOCUMENTS

WO    2013/068783 A1    5/2013

OTHER PUBLICATIONS

Mehdi Azimipour, Farid Atry, and Ramin Pashaie, "Calibration of digital optical phase conjugation setups based on orthonormal rectangular polynomials," Appl. Opt. 55, 2873-2880 (Year: 2016).*
(Continued)

*Primary Examiner* — Tarifur R Chowdhury
*Assistant Examiner* — Jonathon Cook
(74) *Attorney, Agent, or Firm* — Osha Bergman Watanabe & Burton LLP

(57) ABSTRACT

The present invention relates to a method for the non-invasive optical characterization of a heterogeneous
(Continued)

medium, comprising: a step of illuminating, by means of a series of incident light waves, a given field of view of the heterogeneous medium, positioned in a focal plane of a microscope objective (30); a step of determining a first distortion matrix ($D_{ur}$, $D_{rr}$) in an observation basis defined between a conjugate plane of the focal plane (FP) and an observation plane, said first distortion matrix corresponding, in a correction basis defined between a conjugate plane of the focal plane and an aberration correction plane, to the term-by-term matrix product of a first reflection matrix ($R_{ur}$) of the field of view, determined in the correction basis, with the phase conjugate matrix of a reference reflection matrix, defined for a model medium, in said correction basis; and a step of determining, from the first distortion matrix, at least one mapping of a physical parameter of the heterogeneous medium.

17 Claims, 23 Drawing Sheets

(51) Int. Cl.
<table>
<tr><td>G01B 9/02091</td><td>(2022.01)</td></tr>
<tr><td>G01N 21/47</td><td>(2006.01)</td></tr>
<tr><td>G02B 21/36</td><td>(2006.01)</td></tr>
<tr><td>G02B 27/00</td><td>(2006.01)</td></tr>
</table>

(56) References Cited

OTHER PUBLICATIONS

Hilton B. de Aguiar, Sylvain Gigan, and Sophie Brasselet, "Enhanced nonlinear imaging through scattering media using transmission-matrix-based wave-front shaping," Phys. Rev. A 94, 043830—Published Oct. 18, 2016 (Year: 2016).*

Popoff, S.M. et al.; "Measuring the Transmission Matrix in Optics: An Approach to the Study and Control of Light Propagation in Disordered Media"; Physical Review Letters, vol. 10, No. 104, Mar. 2010, pp. 100601-1-100601-4 (4 pages).
Mertz, J. et al.; "Field of view advantage of conjugate adaptive optics in microscopy applications"; Applied Optics, vol. 54, No. 11, Apr. 2015, pp. 3498-3506 (9 pages).
Kang, S. et al.; "Imaging deep within a scattering medium using collective accumulation of single-scattered waves"; Nature Photonics, vol. 9, Mar. 2015, pp. 253-258 (8 pages).
Booth, M.; "Adaptive optical microscopy: the ongoing quest for a perfect image"; Light: Science & Aplications, Apr. 2014, pp. 1-7 (7 pages).
Badon, A. et al.; "Smart optical coherence tomography for ultra-deep imaging through highly scattering media"; Science Advances, Applied Physics, Aug. 2001, pp. 1-8 (8 pages).
Badon, A. et al.; "Spatio-temporal imaging of light transport in highly scattering media under white light illumination: supplementary material"; OPTICA, Oct. 2016, pp. 1-4 (4 pages).
Badon, A. et al.; "Spatio-temporal imaging of light transport in highly scattering media under white light illumination"; OPTICA, vol. 3, No. 11, Nov. 2016, pp. 1160-1166 (7 pages).
International Search Report issued in PCT/EP2019/069158 dated Jan. 15, 2020 (9 pages).
Written Opinion of the International Searching Authority issued in PCT/EP2019/069158 dated Jan. 15, 2020 (5 pages).
Yu, H. et al.; "Measuring large optical reflection matrices of turbid media"; ELSEVIER, Optics Communications, vol. 352, Apr. 29, 2015, pp. 33-38 (6 pages).
Dubois, A. et al.; "Hish-resolution full-field optical coherence tomography with a Linnik microscope"; Applied Optics, vol. 41, No. 4, Feb. 1, 2002, pp. 805-812 (8 pages).
Yang, Q. et al.; "Deep imaging in highly scattering media by combining reflection matrix measurement with Bessel-like beam based optical coherence tomography"; Applied Physics Letters, vol. 113, No. 1, Jul. 3, 2018, (4 pages).

* cited by examiner

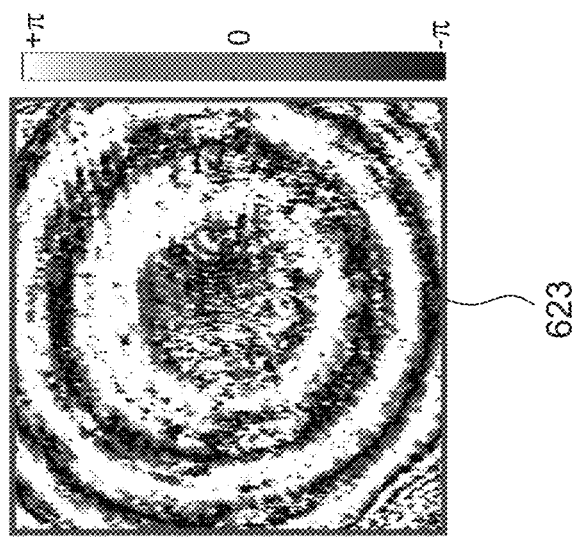
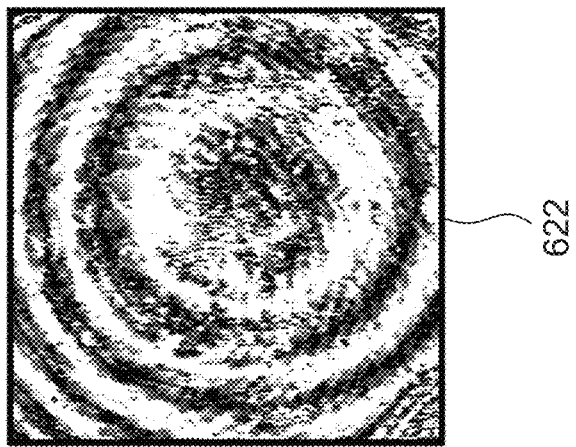
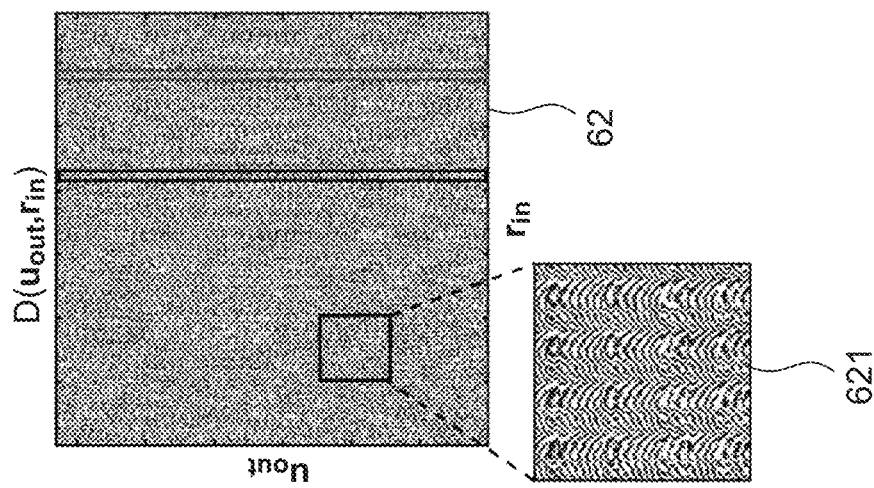
FIG.6C

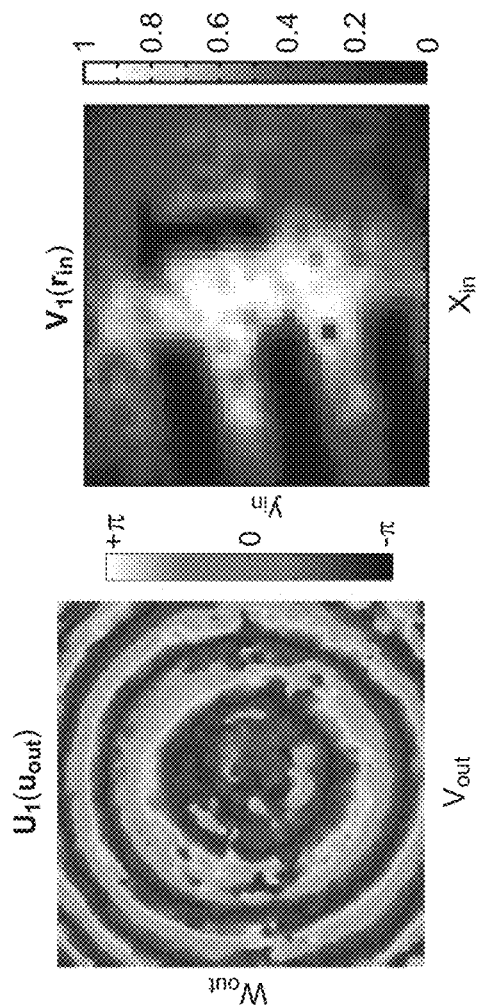
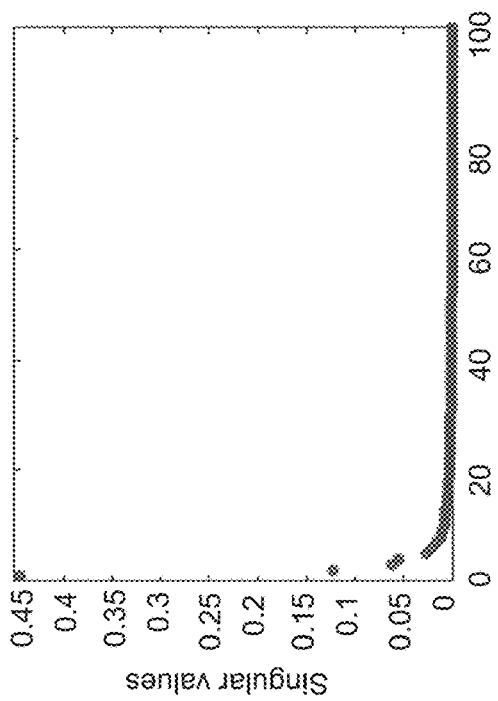
FIG. 7C
FIG. 7B
FIG. 7A

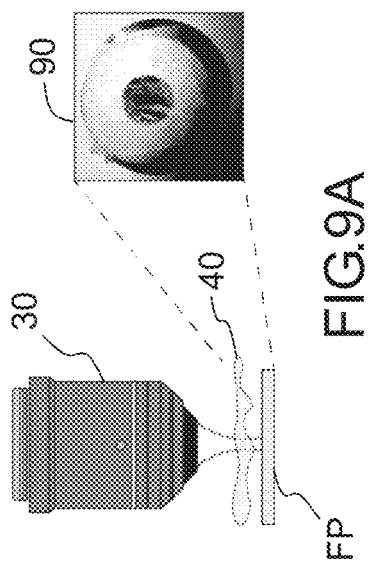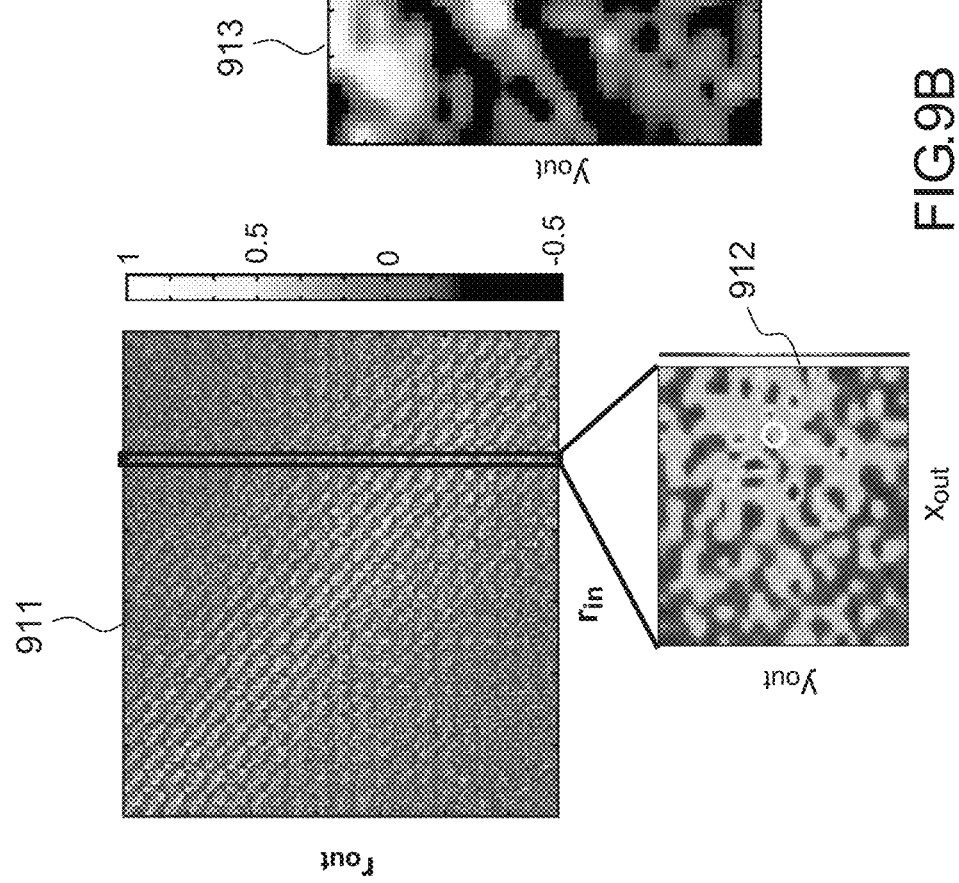
FIG.9A
FIG.9B

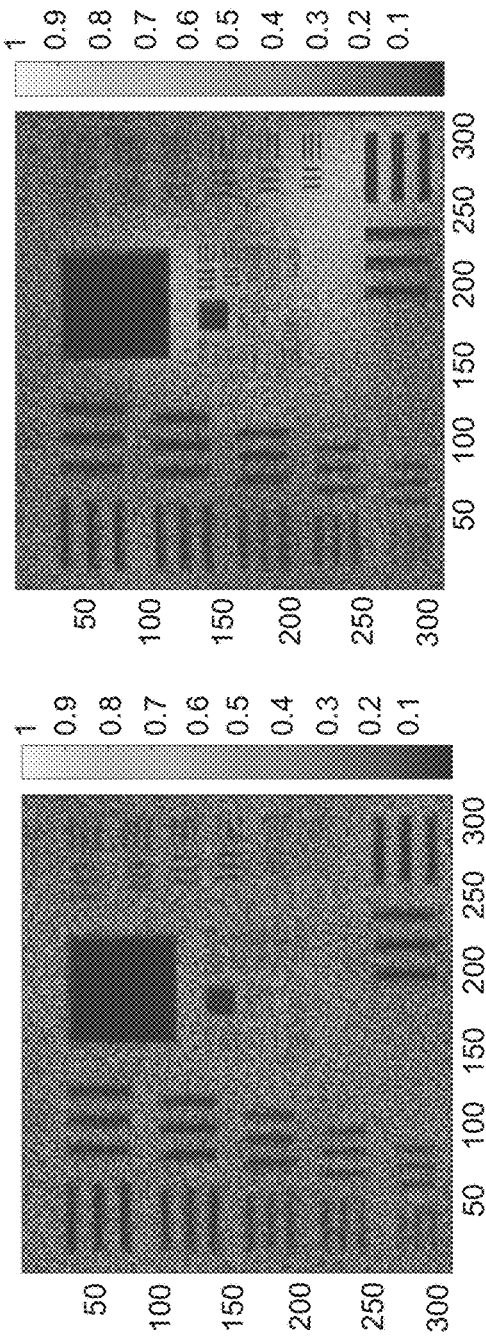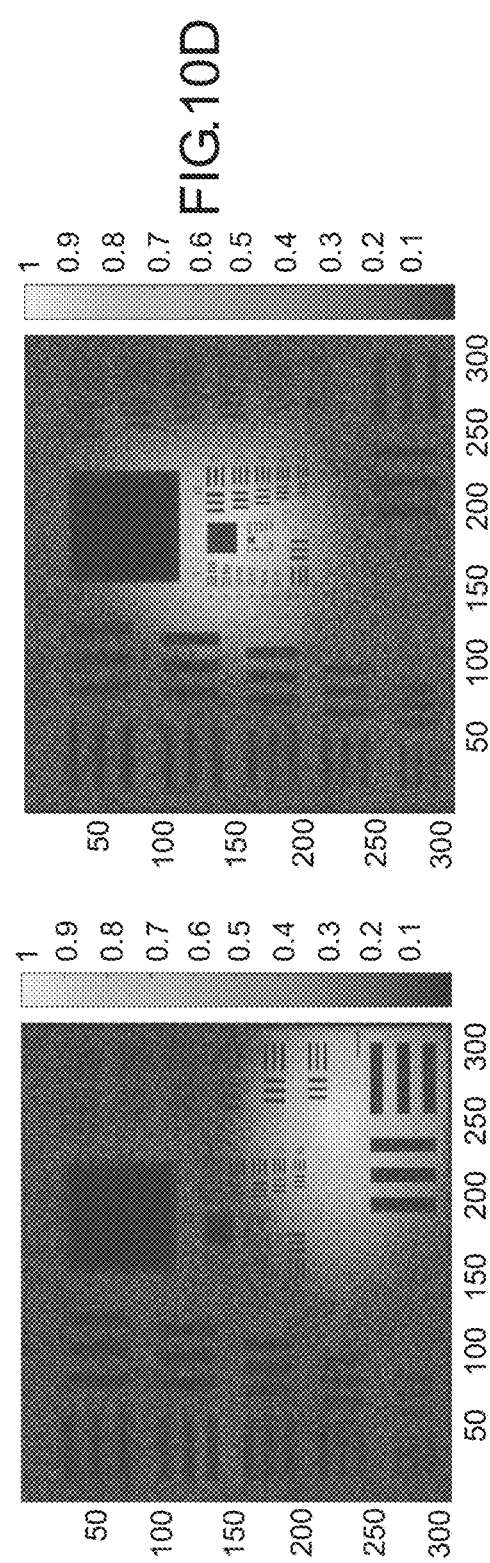

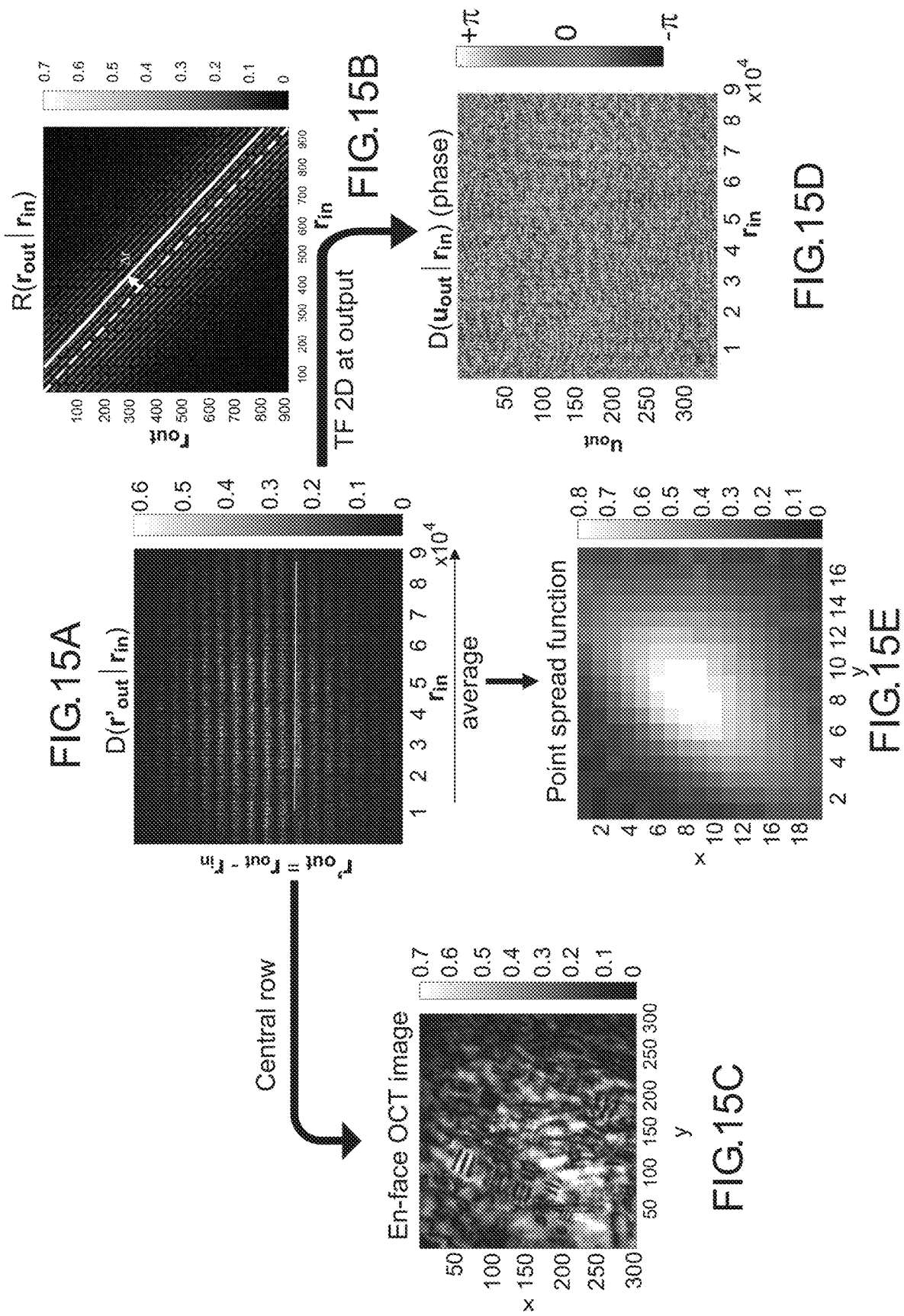

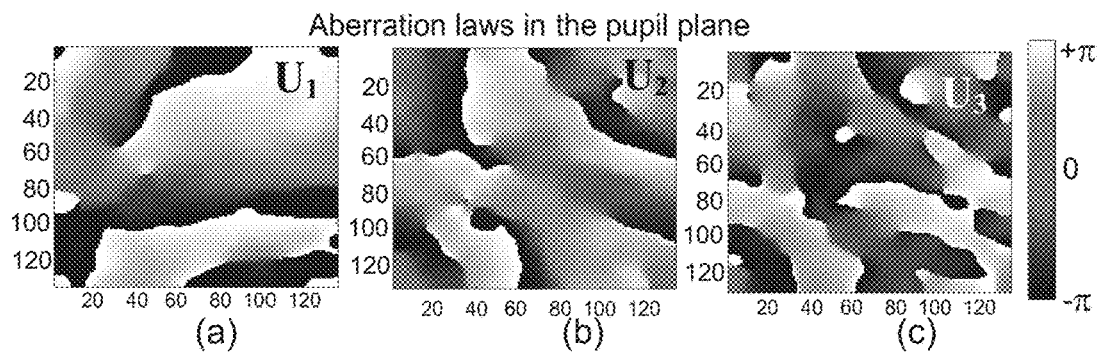
FIG.16A
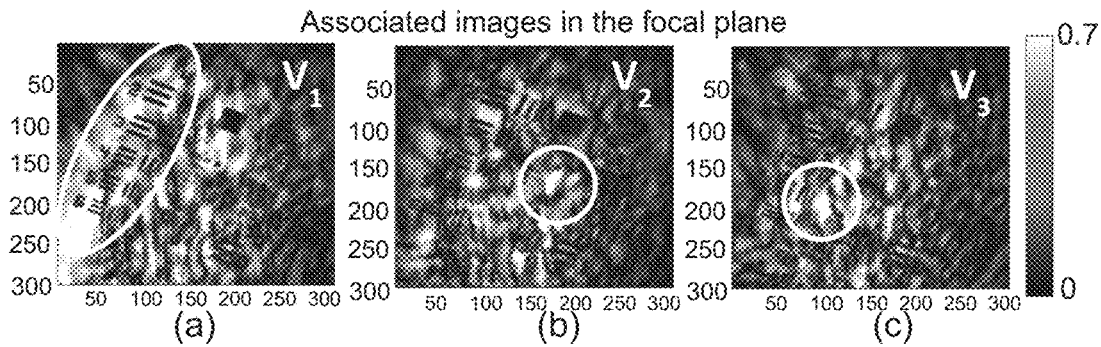
FIG.16B
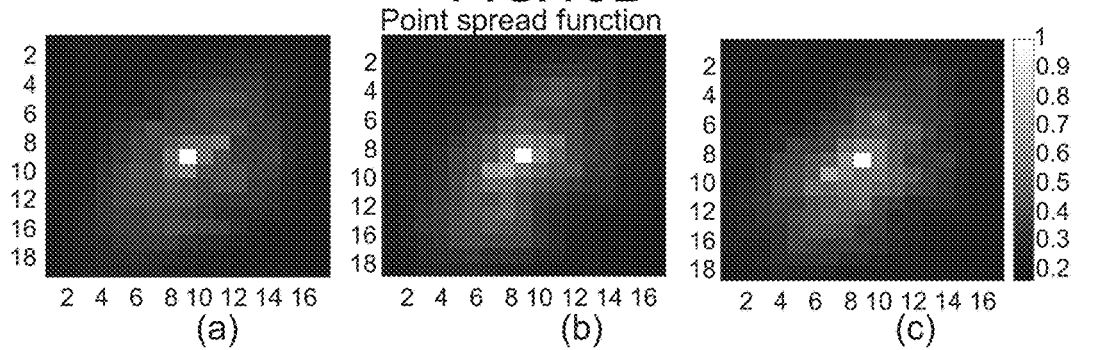
FIG.16C
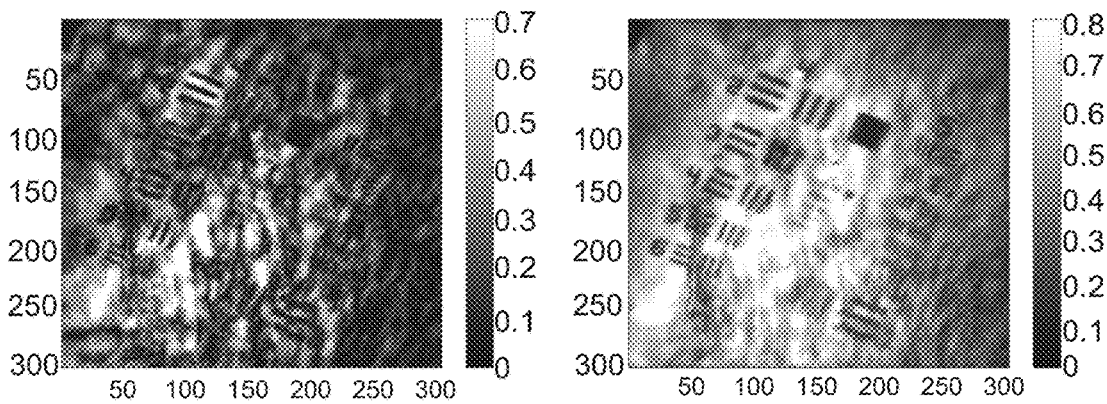
FIG.16D  FIG.16E

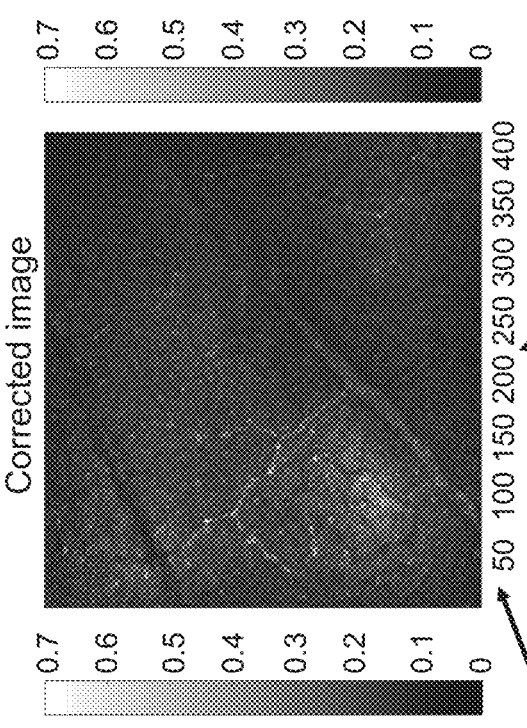
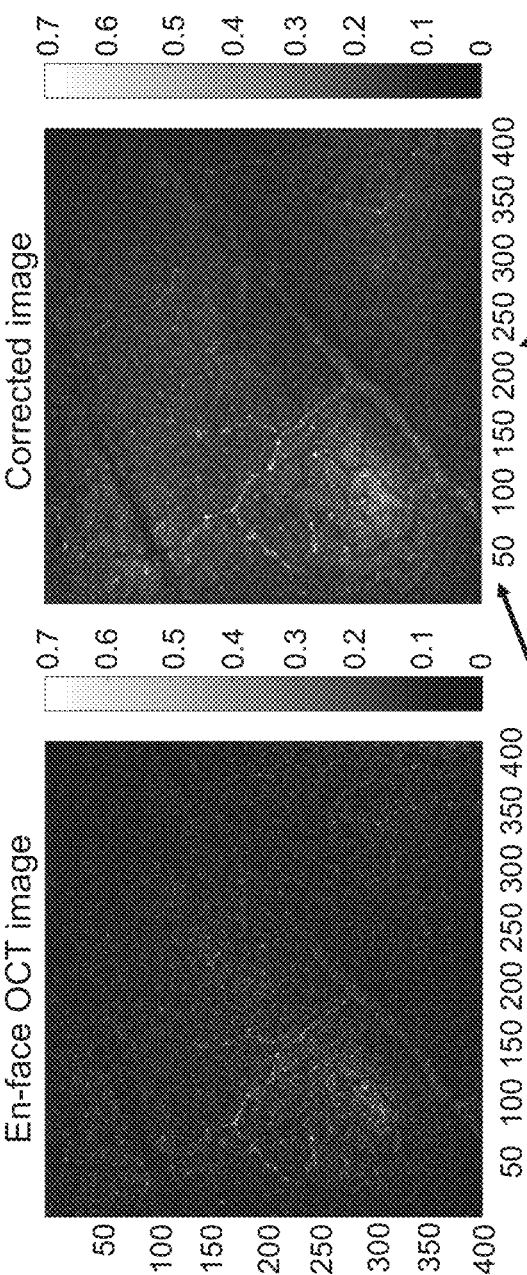
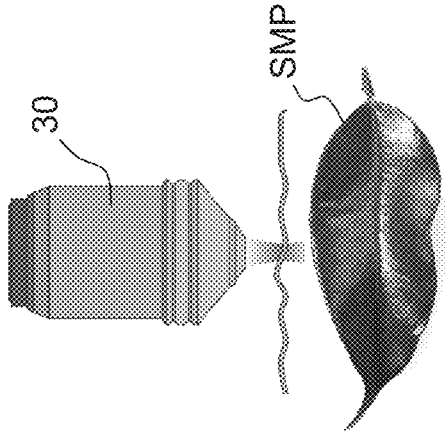
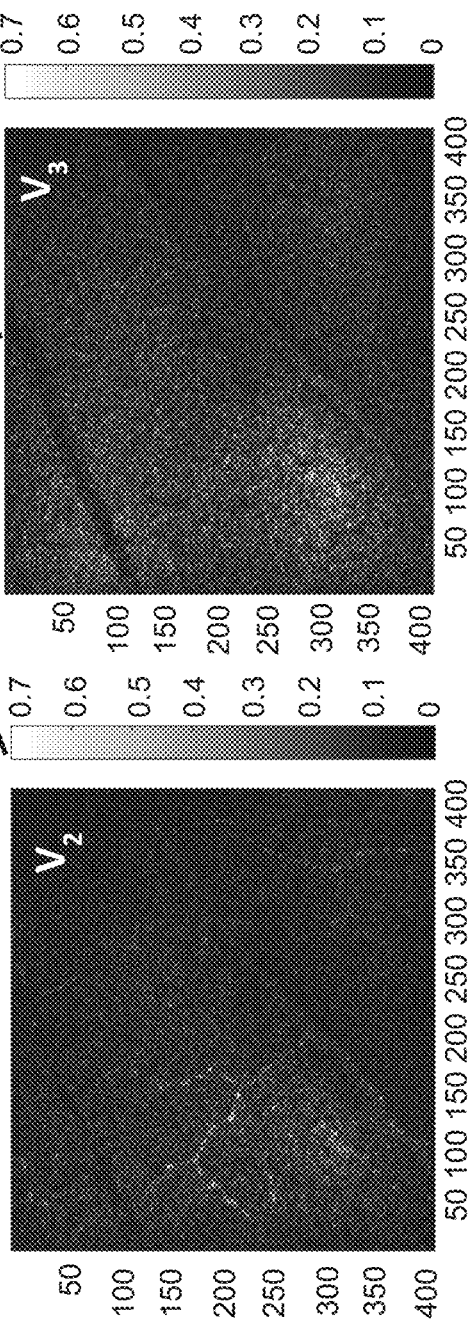
FIG. 17D Corrected image
FIG. 17B En-face OCT image
FIG. 17A
FIG. 17C

METHOD AND SYSTEMS FOR THE NON-INVASIVE OPTICAL CHARACTERIZATION OF A HETEROGENEOUS MEDIUM

TECHNICAL FIELD

The present description relates to methods and systems for the non-invasive optical characterization of a heterogeneous medium, in particular of a biological medium.

PRIOR ART

The resolution of an optical imaging system is linked to its ability to discern the small details of an object. In a perfect optical system, the resolution is limited by diffraction in an absolute manner to $\lambda/2$ (where $\lambda$ is the wavelength used), and more generally by the maximum angle of collection of light rays (i.e. the numerical aperture). From spectacles to microscopes and telescopes, centuries of refinement in polishing, the design of mirrors and aspherical lenses means that it is now known how to manufacture an optical system working at the limit of diffraction. However, the propagation medium between the optical imaging system and the plane to be imaged is not always homogeneous and may introduce aberrations which may severely degrade the quality of the images.

To improve the quality of the images, astronomers have proposed measuring and compensating for these aberrations: this is the principle of adaptive optics, proposed in the 1950s. This requires a loop operating in real time between a wavefront measurement device and a wavefront correction device, all with a response time of the order of a millisecond. Regarding wavefront measurement, Shack-Hartmann analyzers have taken advantage of advances in microfabrication and are now mostly used with CCD or CMOS cameras. Regarding wavefront correction, deformable mirrors are now available with several hundred actuators and a speed sufficient to correct in real time the aberrations resulting from atmospheric disturbances.

In parallel, and on another scale, optical microscopy has also made great progress, both in the quality of the optics with increasingly large numerical apertures, and in the imaging methods, with the appearance of virtual field of view "sectioning" techniques: confocal microscopy, structured illumination microscopy, and nonlinear microscopies. These techniques make it possible to obtain deep tissue images. To them may be added, from ophthalmology, OCT (optical coherence tomography, which makes it possible to select the signal coming from a given depth by using the coherence of the source) which is routinely used in medical practices to obtain 2D and 3D images of the retina. In all these cases, the light passes through tissues of varying index or deformed surfaces and the quality of the images is degraded. However, it is only recently that adaptive optics have been used in biomedical imaging (see for example M. J. Booth, Light Sci. Appl. 3, e165 (2014)).

While it is possible in some cases to generate an "artificial star" (as in astronomy) by focusing a laser on the surface of the retina, measuring a wavefront coming from the depth of a biological sample is more complex than measuring that coming from a star, in particular because it results from an incoherent superposition of echoes associated with unresolved scatterers, forming a speckle image.

A second approach consists in correcting the aberrations without measuring the wavefront, and just by optimizing the quality of the images, i.e. by deforming the wavefront in a controlled manner so as to converge toward an optimal image. The drawback of this type of approach is the choice of a criterion for converging toward an optimized image.

In addition, the aberrations undergone by a wavefront differ according to the location on the image. These regions, called isoplanatic domains and described for example in the article by J. Mertz et al. ("*field of view advantage of conjugate adaptive optics in microscopy applications*", Appl. Opt. 54, 3498-3506, 2015) are often impossible to determine a priori. Correcting aberrations based on techniques known from the prior art generally proves to be problematic when the field of view or ("field of view" or "FOV") contains a plurality of isoplanatic domains.

The concept of isoplanatic domains is illustrated in FIGS. 1A-1D. Imagine an aberrator film 11 placed between a microscope objective 10 and a focal plane of the microscope objective, the focal plane being represented for each of FIGS. 1A-1D by the images 12a-12d, respectively. In the example of FIG. 1A, the wavefront 13a incident on the microscope objective is not corrected. It is therefore distorted after the aberrator film (wavefront 14a) which results in a focal spot 15a that is enlarged with respect to the diffraction limit. In the example of FIG. 1B, the incident wavefront 13b is corrected—for example by means of an adaptive optical system—such that the wavefront 14b at the exit of the aberrator is perfectly corrected (spherical wave). This results, at a given point r of the focal plane, in a diffraction limited focal spot 15b. If this same corrected wavefront is slightly angulated (13c, FIG. 1C) so as to allow focusing at a point r' such that $|r-r'|<l_c$, where $l_c$ is a parameter characteristic of the aberrator, called the coherence length of the aberrator, then the wavefront 14c coming from the aberrator remains corrected and the focusing is always diffraction limited at r' (focal spot 15c). The points r and r' belong to the same isoplanatic domains of the field of view. However, if the corrected incident wavefront is further angulated (13d, FIG. 1D) so as to allow focusing at a point r' such that $|r-r'|>l_c$, then the wavefront 14d coming from the aberrator is distorted and the correction applied does not allow diffraction limited focusing at r' (focal spot 15d). The points r and r' belong in this case to different isoplanatic domains of the field of view.

In the context of the present description, a third way is proposed which is not based on the generation of an artificial star, nor on optimization of the wavefront based on any image quality criterion. The present invention is based on a matrix-based approach to optical imaging and aberration correction.

A matrix-based approach to the propagation of light waves within heterogeneous media was first developed in transmission, in particular for the purposes of communication through highly scattering media—see article by S. M. Popoff et al. (Phys. Rev. Lett. 104, 100601, 2010). Recently, the matrix-based approach has been used for deep imaging through highly scattering media (see A. Badon et al. "*Smart optical coherence tomography for ultra-deep imaging through highly scattering media*", Sci. Adv. 2016; 2:e1600370). This approach, called "smart OCT" in the article, comprises the experimental determination of a reflection matrix in real space (or "focal plane" reflection matrix) by means of an experimental setup a diagram of which is shown in FIG. 2.

A laser beam from a femtosecond laser source 21 is spatially shaped by a spatial light modulator (SLM) 22 acting as a dynamic diffraction grating. A set of plane waves is then emitted by the SLM, the plane waves being focused at different focus points $r_{in}$ of the object focal plane of a microscope objective 23. For each focus point n, the reflected field $E_r(u_{out}, r_{in}, t)$ is collected through the same microscope objective 23 and interferes with a reference wave $E_0(u_{out}, 0, t)$ on a two-dimensional acquisition device 24, for example a CCD camera, conjugate with the pupil plane of the microscope objective. The interference pattern between these two waves integrated over time t gives access to the coefficients $R(u_{out}, r_{in})$ of a column of the reflection matrix $R_{ur}$ windowed temporally:

$$R(u_{out}, r_{in}) = \int dt E_r(u_{out}, r_{in}, t) \times E_0^*(u_{out}, 0, t+\tau)$$

In practice, the amplitude and the phase of each coefficient $R(u_{out}, r_{in})$ are recorded by phase shifting interferometry. The time of flight $\tau$ is controlled by the length of the reference arm of the interferometer by means of a mirror 25 the position of which is adjusted by a piezoelectric actuator (PZT). The time of flight is adjusted to the ballistic time for most of the applications envisaged, so as to eliminate multiply scattered photons and retain only those photons scattered singly by the reflectors contained in the focal plane of the sample. For each entrance focus point $r_{in}$ in the focal plane, the reflection coefficient $R(u_{out}, r_{in})$ is recorded in a plane conjugate with that of the exit microscope objective pupil (identified by the vector $u_{out}$). A two-dimensional Fourier transform on the coordinate $u_{out}$ makes it possible to determine the reflection coefficient $R(r_{out}, r_{in})$ in a plane conjugate with the exit focal plane identified by the vector $r_{out}$. For each entrance focus point $r_{in}$ in the focal plane, the reflection coefficient $R(r_{out}, r_{in})$ is recorded and stored along a column vector. Lastly, the set of column vectors forms the reflection matrix $R_{rr}$ in the focal plane. Thus obtained is a temporally windowed "focal plane" reflection matrix, the diagonal elements of which ($r_{in}=r_{out}$) form an "en-face" section of the image of the sample as it would be obtained in OCT (for a description of full-field OCT imaging, see for example the published patent application US20040061867). The "smart OCT" approach then consists in applying a filter to the focal plane reflection matrix so as to filter the non-diagonal elements of the reflection matrix which are mainly associated with multiple scattering effects. This mathematical operation thus amounts to numerically producing a confocal image with a virtual hole of adjustable size determined according to the width of the aberrated focal spot and of the size of the target to be imaged. Decomposing the resulting filtered matrix into singular values makes it possible, by combining the first input and output singular vectors, to reconstruct an image of the focal plane from which a large part of the multiple scattering noise has been removed.

Thus, the "smart OCT" described in the article by A. Badon et al. makes it possible, with respect to OCT techniques and by virtue of matrix-based discrimination of singly and multiply scattered photons, to multiply the depth of penetration into a highly scattering medium twofold. However, the approach developed so far allows only the detection of targets buried in multiply scattering media but does not allow the correction of the aberrations introduced by the optical system or the medium itself, let alone the imaging of a field of view containing a plurality of isoplanatic domains.

The present invention presents a novel matrix-based approach for optical imaging and for simultaneous correction of aberrations over a plurality of isoplanatic domains of the field of view.

SUMMARY

The present description relates, according to a first aspect, to a method for the non-invasive optical characterization of a sample formed of a heterogeneous medium, comprising:

- a step of illuminating, by means of a series of incident light waves, a given field of view of said heterogeneous medium, positioned in a focal plane of a microscope objective;
- a step of determining a first distortion matrix in an observation basis defined between a conjugate plane of said focal plane and an observation plane, said first distortion matrix corresponding, in a correction basis defined between a conjugate plane of said focal plane and an aberration correction plane, to the term-by-term matrix product of a first reflection matrix of said field of view, determined in said correction base, with the phase conjugate matrix of a reference reflection matrix, defined for a model medium, in said correction base;
- a step of determining, on the basis of said first distortion matrix, at least one mapping of a physical parameter of said heterogeneous medium.

Each coefficient or "element" of the first reflection matrix corresponds to a complex reflection coefficient of the sample determined at a point of the correction plane for a given focused illumination. It may be obtained via the cross-interference term between the wave reflected by the sample for said focused illumination and a reference wave. The term-by-term matrix product or "Hadamard product" of the first reflection matrix by the phase conjugate matrix of the reference reflection matrix, amounts to subtracting, from the phase of each element of the reflection matrix, the phase of the corresponding element of a reflection matrix defined for a model medium. An expected ballistic component (defined by the model medium) is thus subtracted from the phase of each element of the first reflection matrix, which makes it possible to isolate a distorted component for each point of illumination of the field of view. The applicants have shown that analyzing the distortion matrix makes it possible in particular to discriminate the isoplanatic domains contained in the field of view and to determine, in the observation plane, an aberration law associated with each isoplanatic domain.

The model medium or "reference medium" is for example a homogeneous medium with an optical index equal to the effective index (or average index) of the propagation medium. Depending on the degree of knowledge a priori of the propagation medium, the model medium may take more elaborate forms (e.g. multilayer medium etc.).

A heterogeneous medium within the meaning of the present description comprises any medium having a spatially inhomogeneous optical index and reflecting part of the incident light wave. By way of example, this medium may in particular consist of layers of different optical indices, including layers of air when it is sought to observe, for example, an element located behind a scattering object; this may be biological media such as the skin, the retina or tissues resulting from a biopsy, but also other media that may be examined by microscopy, for example in metallography (piece of metal) or in petrography (analysis of rocks). The methods and systems described in the present description allow in particular a non-invasive deep optical characterization of such a heterogeneous medium.

A physical parameter of the heterogeneous medium may comprise, for example: aberration laws associated with each isoplanatic domain contained in the field of view ("FOV"), a parameter characteristic of the optical reflectivity of the medium, a parameter characteristic of the refractive index of the medium or a multiple scattering rate.

The aberrations of a wavefront propagating through a medium and/or an optical system correspond to the difference between the wavefront coming from this medium and/or optical system and that which would be expected in an ideal case. These aberrations may be linked for example to imperfections of the optical imaging system (for example spherical aberration, coma, astigmatism, etc.). In the context of the present description, the aberrations caused by the propagation medium itself, i.e. by spatial fluctuations in its optical refractive index, are mainly targeted.

The observation plane is for example the aberration correction plane, for example when a mapping of the aberration laws is sought. The aberration correction plane may be a plane conjugate with the pupil plane of the microscope objective or a plane conjugate with the plane of the aberrator when the latter may be considered as a two-dimensional phase screen. In a more general case, it is sought to find a correction plane that maximizes the size of the isoplanatic domains contained in the field of view. The observation plane may also be a plane conjugate with the focal plane, when it is sought to draw up a map of the point spread function of the imaging system (or spatial impulse response of the imaging system), or a map of the multiple scattering rate.

The applicants have shown that the distortion matrix may comprise a preliminary step of determining said first reflection matrix, or be obtained directly by means of particular experimental setups.

Thus, according to one or more exemplary embodiments, the determination of the first distortion matrix comprises a preliminary step of determining said first reflection matrix in the observation basis (reflection matrix windowed temporally or determined in the frequency domain) then constructing said first distortion matrix on the basis of said first reflection matrix and of said reference reflection matrix defined in the same base.

According to one or more exemplary embodiments, the observation basis is the correction base, and the first distortion matrix is constructed by the term-by-term matrix product of said first reflection matrix of said field of view determined in the correction basis with the phase conjugate matrix of the reference reflection matrix defined in the same base. It is possible, according to one example, to experimentally determine the first reflection matrix in a basis different from the correction basis and then to determine the reflection matrix in the correction base, just by changing base.

According to one or more exemplary embodiments, the observation basis is a focused basis defined between two conjugate planes of the focal plane, and said first distortion matrix is constructed by the spatial correlation between each row and/or column of the "focal plane" reflection matrix defined in said focused basis and the same row and/or column of the reference reflection matrix defined in the same base.

According to one or more exemplary embodiments, the reference medium is a homogeneous medium with an optical index equal to the effective index (or average index) of the propagation medium. The reference reflection matrix may be established theoretically for this reference medium with a plane mirror in the focal plane of the microscope objective. Depending on the degree of knowledge a priori of the propagation medium, the reference medium may take more elaborate forms (e.g. multilayer medium etc.). In this case, the reference matrix could be calculated numerically. The construction of the distortion matrix amounts to subtracting, from the phase of each element of the measured first reflection matrix, the phase of the corresponding element of the reference reflection matrix.

According to one or more exemplary embodiments, the determination of said first distortion matrix is obtained directly, without prior determination of a reflection matrix.

According to one or more exemplary embodiments, the determination of said first distortion matrix is carried out experimentally by means of at least one first interferometer illuminated with coherent light. The method is then characterized in that:

said illuminating step comprises illuminating an object arm and a reference arm of the first interferometer by means of identical, spatially coherent light waves, the object arm comprising the microscope objective in the focal plane of which is located said heterogeneous medium and the reference arm comprising a reference mirror;

said first distortion matrix is determined in said correction basis and the determination of the first distortion matrix comprises the following steps.

for each light wave incident at a point of the focal plane, acquiring, in said correction plane, an interferogram resulting from the interference between the electromagnetic field reflected by said point and the electromagnetic field reflected by the reference mirror;

constructing said first distortion matrix, each column of the first distortion matrix corresponding, for an incident light wave focused at a point of the focal plane, to the electromagnetic field associated with the cross-interference term of said interferogram.

Through the illumination of the object arm and of the reference arm with the same incident light waves, the applicants have shown that the electromagnetic field associated with the cross-interference term of the interferogram thus obtained is directly associated with the distorted component of the reflected electromagnetic field. The reference medium may be air, or a more complex medium, obtained for example by introducing a gel to the reference arm. Said first interferometer is for example a Linnik interferometer with two objectives on each of the arms, advantageously two identical objectives. The determination of the cross-interference term of the interferogram is for example obtained by phase shifting interferometry. Thus, each column of the first distortion matrix corresponds, for an incident light wave focused at a point of the focal plane, to the cross-interference term of an interferogram measured in the observation plane and resulting from the interference between the electromagnetic field reflected by said point in the object arm and the electromagnetic field reflected by a point conjugate with said point on the reference mirror. The correction plane is for example a conjugate plane of said plane of the exit pupil of the microscope objective. A focal plane scan allows the entire distortion matrix to be reconstructed.

According to one or more exemplary embodiments, said first distortion matrix is determined experimentally by full-field low coherence interferometry in what is called a focused basis defined between two conjugate planes of said focal plane. The method is then characterized in that:

said illuminating step comprises full-field illuminating an object arm and a reference arm of a first interferometer by means of spatially incoherent light waves, the object arm comprising the microscope objective in the focal plane of which is located said heterogeneous medium and the reference arm comprising a reference mirror, the waves reflected by the heterogeneous medium and the reference mirror at the output of the first interferometer exhibiting a spatial shift in a plane conjugate with the focal plane, the shift being variable;

said first distortion matrix is determined in a focused basis defined between two conjugate planes of the focal plane and the determination of said first distortion matrix comprises the following steps:

For each spatial shift, acquiring, in a conjugate plane of the focal plane, an interferogram resulting from the interference between said waves reflected by the heterogeneous medium and the reference mirror and spatially shifted;

constructing said first distortion matrix, each row of the first distortion matrix corresponding, for a spatial shift value, to the electromagnetic field associated with the cross-interference term of said interferogram.

The applicants have shown that each row of said first distortion matrix thus determined is a subdiagonal of the "focal plane" reflection matrix. It is thus possible to determine a distortion matrix under incoherent illumination and without focal plane scanning.

According to one or more exemplary embodiments, the determination of at least one mapping of a physical parameter of said heterogeneous medium comprises:

determining the invariants in said focal plane of said first distortion matrix, in order to identify at least one first isoplanatic domain in said focal plane;

determining, for each first isoplanatic domain identified, a mapping of a first law of aberration in the aberration correction plane.

The correction plane of the correction basis in which said first distortion matrix is defined is then advantageously a plane that maximizes the size of the isoplanatic domains contained in the field of view, for example a plane conjugate with the plane of an aberrator if the latter is two-dimensional, or for example a plane conjugate with a pupil plane of the microscope objective. The first distortion matrix may be obtained directly in said observation basis or by changing basis from a distortion matrix determined in another base, for example a "focal plane" distortion matrix.

Several known methods may be implemented in order to determine the invariants of the first distortion matrix. According to one or more exemplary embodiments, the determination of the invariants in said focal plane of said first distortion matrix comprises a singular value decomposition of said first distortion matrix, a singular value decomposition of said first normalized distortion matrix, that is to say the modulus of each of the elements of which will have been normalized but the phase of which will have been preserved, or a singular value decomposition of a normalized correlation matrix of said first distortion matrix, that is to say a correlation matrix of said first distortion matrix the modulus of each of the elements of which will have been normalized.

Assuming a specular reflection by the heterogeneous medium, which is often the case at optical frequencies, the applicants have shown that a mapping of the reflectivity of the heterogeneous medium for the entirety of the field of view may be obtained by means of a linear combination of the singular vectors of said first distortion matrix.

The applicants have also shown that the singular value decomposition of the distortion matrix makes it possible to filter the noise subspace (random matrix without correlation between its rows and columns) of the signal subspace (matrix characterized by substantial correlations between its rows and/or its columns), the noise subspace containing both the experimental noise and the incoherent contribution of the reflected field caused by multiple scattering events occurring upstream of the focal plane.

According to one or more exemplary embodiments, the method according to the present description further comprises determination of the point spread function of the imaging system. The point spread function of the imaging system (or impulse response or "PSF") corresponds to the spatial Fourier transform of the aberration law measured in the pupil plane. It is spatially invariant on each isoplanatic domain. It may be obtained, according to one example, from the singular value decomposition of the "focal plane" distortion matrix.

According to one or more exemplary embodiments, the method according to the present description further comprises the determination, in said observation base, of a first reflection matrix of said field of view corrected by said one or more first aberration laws. This makes it possible, in particular when assuming a random scattering reflection by the sample, to determine a mapping of the reflectivity of the medium, or "image", corrected for aberrations.

On the basis of said corrected first reflection matrix of the field of view, it is possible, according to one or more exemplary embodiments, to determine a second distortion matrix. The second distortion matrix corresponds, in said correction base, to the term-by-term matrix product of said corrected reflection matrix determined in said correction base, with the phase conjugate matrix of said reference reflection matrix. The second distortion matrix makes it possible, by determining its invariants in the focal plane, to refine the correction in the first isoplanatic domain identified. It also makes it possible to identify at least one second isoplanatic domain in said focal plane and to determine, for each second isoplanatic domain identified, a mapping of a second aberration law in said correction plane. The method may thus be iterated as many times as necessary depending on the number of isoplanatic domains contained in the field of view in order to obtain a mapping of the reflectivity of the medium, or "image", corrected for aberrations. This iterative process applies more particularly when assuming a random scattering or intermediate reflection, that is to say a mixed specular and random scattering reflection.

According to one or more exemplary embodiments, the method according to the present description further comprises the identification and/or elimination of the specular component of the reflected field and/or of the multiple reflections arising between the various interfaces of the heterogeneous medium. To this end, the distortion matrix may be projected into the Fourier plane both at input and at output. In this base, the specular and multiply reflected components of the field appear for precise reflected and incident angle pairs. They may therefore be easily filtered and only the random scattering component (speckle) of the reflected field is retained. This discrimination of the random scattering component then makes it possible to directly access the aberration laws to be applied at input and output in order to correct the reflection matrix and obtain an optimal image of the medium. Specifically, if the specular component predominates, there is only access to the cumulative aberration laws for the incident wave going out and for the reflected wave on return, which prevents optimal correction of the random scattering component of the object. In addition, filtering the distortion matrix in the Fourier plane makes it possible to eliminate the multiple reflections between interfaces that may contaminate optical coherence tomography images.

According to a second aspect, the present description relates to systems for the implementation of one or more exemplary embodiments of a method for the non-invasive optical characterization of a heterogeneous medium according to the first aspect.

In particular, the present description relates to systems allowing direct determination of the first distortion matrix, without prior determination of the first reflection matrix, by means of a suitable interferometric setup.

Thus, according to one or more exemplary embodiments, the present description relates to a system for the non-invasive optical characterization of a heterogeneous medium comprising:
- a first microscope objective defining a focal plane in which said heterogeneous medium is intended to be positioned;
- a light emitting device for emitting a series of incident light waves, which are intended to illuminate, through said microscope objective, a given field of view of said heterogeneous medium;
- a two-dimensional acquisition detector arranged in an observation plane;
- a first interferometer coupled to the light emitting device and to the two-dimensional acquisition detector, comprising an object arm with said microscope objective and a reference arm comprising a reference mirror at the focal point of a second microscope objective, said first interferometer being configured to form, at said observation plane, interferences between waves reflected by the heterogeneous medium and said reference mirror,
- a computing unit, coupled to the two-dimensional acquisition detector, and configured to
  - determine, on the basis of the interferograms resulting from said interferences, a first distortion matrix in an observation basis defined between a conjugate plane of said focal plane and said observation plane, said first distortion matrix corresponding, in a correction basis defined between a conjugate plane of said focal plane and an aberration correction plane, to the term-by-term matrix product of a first reflection matrix of said field of view determined in said correction base, with the phase conjugate matrix of a reference reflection matrix, defined for a model medium, in said correction base;
  - determine, on the basis of said first distortion matrix, at least one mapping of a physical parameter of said heterogeneous medium.

According to one or more exemplary embodiments, the light emitting device is configured to illuminate said object arm and said reference arm by means of identical, spatially coherent light waves.

According to this example, the observation plane is an aberration correction plane and the two-dimensional acquisition device is configured to acquire, in said correction plane, and for each light wave incident at a point of the focal plane, an interferogram resulting from the interference between the electromagnetic field reflected by said point and the electromagnetic field reflected by the reference mirror. The computing unit is configured to construct said first distortion matrix, each column of the first distortion matrix corresponding, for an incident light wave focused at a point of the focal plane, to the electromagnetic field associated with the cross-interference term of said interferogram.

According to one or more exemplary embodiments, the light emitting device is configured to illuminate the entirety of the field of view ("full-field" illumination) on said object and reference arms by means of spatially incoherent light waves.

According to this example, the system is configured to form, at the exit of said first interferometer, waves reflected by said heterogeneous medium and said reference mirror, which are mutually coherent, and exhibit a spatial shift in a plane conjugate with the focal plane, the shift being variable. The observation plane is a plane conjugate with the focal plane and the two-dimensional acquisition device is configured to acquire, in said observation plane, and for each spatial shift, an interferogram resulting from the interference between said waves reflected by the heterogeneous medium and the reference mirror and spatially shifted. The computing unit is configured to construct said first distortion matrix, each row of the first distortion matrix corresponding, for a spatial shift value, to the electromagnetic field associated with the cross-interference term of said interferogram.

Such a system makes it possible, with respect to a system with coherent illumination, to omit the scanning of the field of view.

The applicants have developed several systems that make it possible to achieve the variable spatial shift between the reflected and reference waves.

Thus, according to a first exemplary embodiment, said first interferometer comprises a first beam splitter configured to form said object and reference arms. The reference arm comprises a second beam splitter configured to send said illuminating waves to said reference mirror and to a second mirror, said second mirror being arranged in a plane conjugate with a pupil plane of said microscope objective, and exhibiting a variable inclination with respect to an optical axis defined by the optical axis of the microscope objective; the object arm comprises a third beam splitter configured to send said illuminating waves to said heterogeneous medium and to a third mirror, said third mirror being arranged in a plane conjugate with a pupil plane of said microscope objective, perpendicular to an optical axis defined by the optical axis of the microscope objective. Said first interferometer comprises a fourth beam splitter configured to combine the waves reflected by the heterogeneous medium and the reference mirror, coming from the object and reference arms.

According to a second exemplary embodiment, the optical characterization system further comprises a second illuminating interferometer configured to receive said spatially incoherent light waves from the light emitting device and to form two polarized illuminating waves with orthogonal polarizations and exhibiting a spatial shift in a plane conjugate with the focal plane; said first interferometer comprises a polarization splitting element configured to send to the object and reference arms, respectively, each of said polarized waves with orthogonal polarizations and exhibiting a spatial shift.

The orthogonal polarizations may be rectilinear, circular or any other polarization that makes it possible to form two orthogonal polarizations.

Such a system is advantageous in that it allows the two interferometers to be adjusted separately, which affords greater ease of use.

BRIEF DESCRIPTION OF THE FIGURES

Other advantages and features of the technique presented above will become apparent from reading the detailed description below, provided with reference to the figures in which:

FIGS. 6A to 6C illustrate, respectively, (FIG. 6A) a first exemplary reflection matrix in the case of a sample introducing a specular reflection and for a defocus defect (a single isoplanatic domain), (FIG. 6B) the corresponding focal plane reflection matrix and an exemplary point spread function obtained on the basis of the focal plane reflection matrix, and (FIG. 6C) a distortion matrix obtained on the basis of the reflection matrix of FIG. 6A;

FIGS. 7A to 7C illustrate, respectively, the spectrum of the normalized singular values of the distortion matrix shown in FIG. 6C, the mapping of the phase of the first output eigenvector ($U_1$) and the mapping of the modulus of the first input eigenvector ($V_1$);

FIGS. 9A-9D illustrate a second exemplary use of the distortion matrix (case of a plurality of isoplanatic domains) and more precisely, FIG. 9A, a diagram of the experimental setup, FIG. 9B, the measured focal plane reflection matrix and examples of a focal spot and confocal image extracted from the focal plane reflection matrix;

FIG. 9C, the spectrum of the normalized singular values of the distortion matrix corresponding to the measured reflection matrix and FIG. 9D, mappings of the phase of the output eigenvectors (Us), mappings of the modulus of the input eigenvectors ($V_i$), a conventional OCT image, an image obtained by adaptive optics, and an image obtained by means of a combination of said input eigenvectors;

FIGS. 10A-10D illustrate results obtained from a numerical simulation of the distortion matrix in the case of a random phase resolution test pattern (random scattering reflection) imaged through an aberrator; thus, FIG. 10A shows the confocal image of the object according to the prior art, FIG. 10B shows the image corrected on the basis of the first eigenvector $U_1$ of the distortion matrix, FIGS. 10C-D present the images obtained after iterating the correction on the basis of the two first eigenvectors, $U_1^{(1)}$ and $U_2^{(1)}$, of the normalized correlation matrix of $D^{(1)}$;

FIGS. 15A-15E on the one hand and 16A-16E on the other hand, illustrate the use of the distortion matrix shown in FIG. 14B to obtain a corrected image;

FIGS. 17A-17D illustrate the application of the method according to the present description to the deep imaging of a biological medium in a mixed specular and random scattering mode (experimental setup of the type of FIG. 13).

In the various embodiments which will be described with reference to the figures, similar or identical elements bear the same references.

DETAILED DESCRIPTION

Figure 1A:
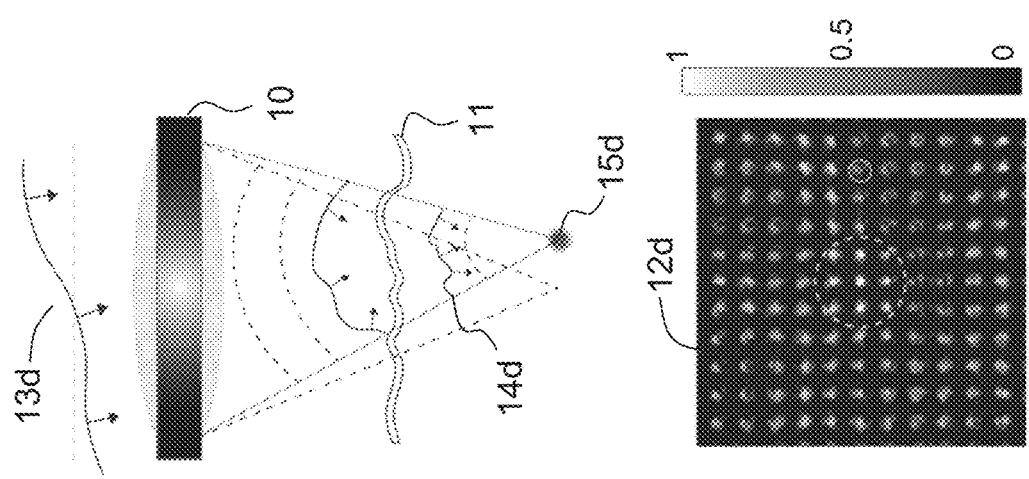
FIGS. 1A-1D (already described) schematically illustrate the concept of isoplanatic domains.
Figure 1B:
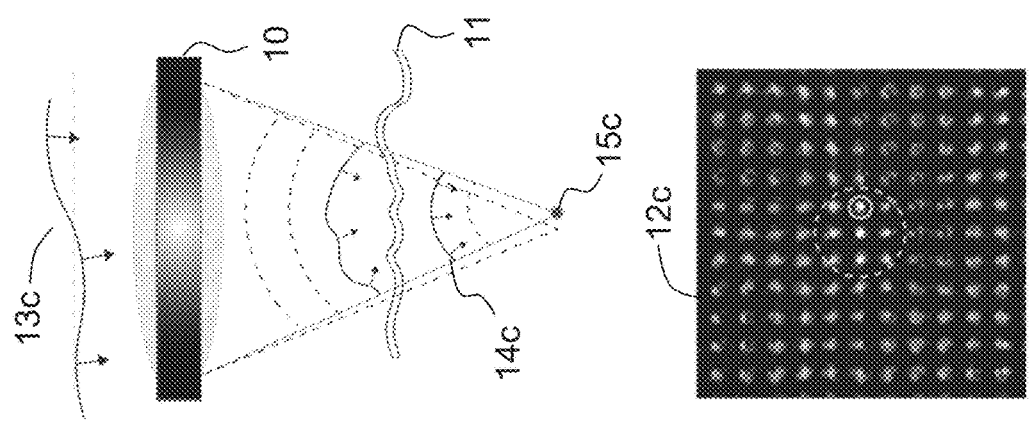
Figure 1C:
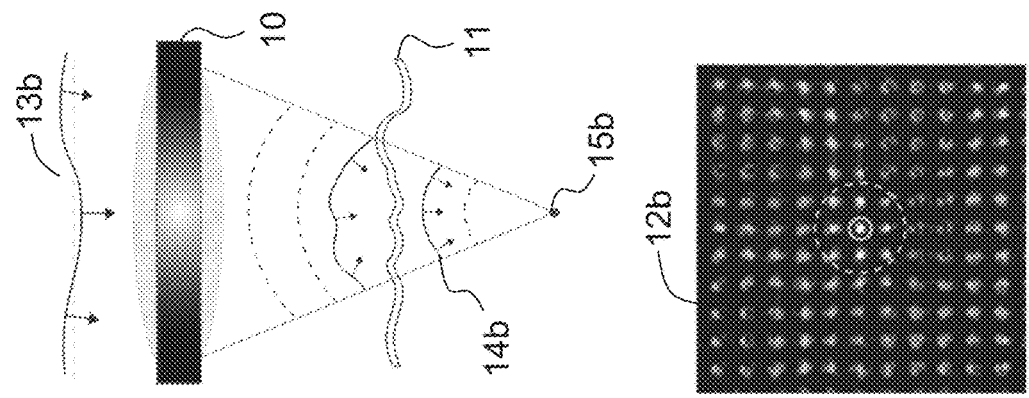
Figure 1D:
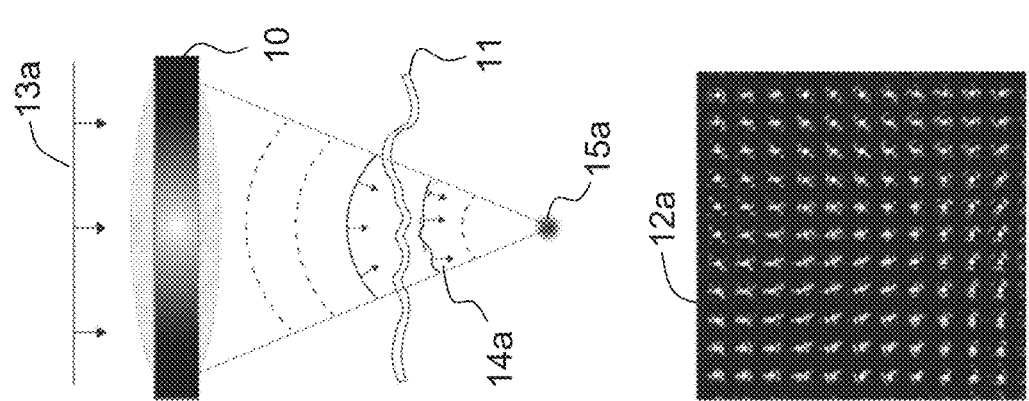

In the detailed description which follows, only some embodiments are described in detail in order to ensure clarity of the description, but these examples are not intended to limit the general scope of the principles that emerge from the present description.

The various embodiments and aspects described in the present description may be combined or simplified in multiple ways. In particular, the steps of the various methods may be repeated, reversed, or performed in parallel, unless otherwise specified.

When, in the present description, reference is made to calculating or processing steps for the implementation in particular of method steps, it is understood that each calculating or processing step may be implemented by software, hardware, firmware, microcode or any appropriate combination of these technologies. When software is used, each calculating or processing step may be implemented by computer program instructions or software code. These instructions may be stored in or transmitted to a storage medium that is readable by a computer (or computing unit) and/or be executed by a computer (or computing unit) in order to implement these calculating or processing steps.

(Definition of the Distortion Matrix)

The present description describes methods and systems for the non-invasive optical characterization of a heterogeneous sample, placed in the focal plane of a microscope objective. These methods and systems are based on the determination of at least one first matrix called a "distortion matrix" in the remainder of the description.

The notations used in the present description to identify the various planes of the optical system used for the characterization of the sample are defined by means of FIG. 3 which illustrates only some of the elements of the system for the sake of simplicity.

Thus, the focal plane of the microscope objective 30 is referenced FP and is intended to receive the sample. Let r denote a point of the focal plane FP, defined by its Cartesian coordinates (x, y). Let InP denote the plane of the entrance pupil of the microscope objective or any plane conjugate with the plane of the entrance pupil of the microscope objective. The entrance pupil is intended to receive the incident light waves for the illumination of a field of view of the sample that it is sought to characterize. Let $u_{in}$ denote a point of the plane of the entrance pupil InP, defined by its Cartesian coordinates ($v_{in}$, $w_{in}$). Let OutP denote the plane of the exit pupil of the microscope objective or any plane conjugate with the plane of the exit pupil of the microscope objective. The exit pupil is intended to receive the light waves reflected by the field of view of the sample that it is sought to characterize. Let $u_{out}$ denote a point of the plane of the exit pupil OutP, defined by its Cartesian coordinates ($v_{out}$, $w_{out}$). The entrance and exit paths comprising, respectively, the entrance and exit pupils are separated in this example by a beam splitter element 31. On the entrance path, SP denotes the source plane of the optical system, conjugate with the focal plane of the microscope objective, in this example by means of an optic 32 forming, with the microscope objective 30, a setup 4f. Let $r_{in}$ denote a point of the source plane SP, defined by its Cartesian coordinates ($x_{in}$, $y_{in}$). On the exit path, ImP denotes the image plane of the optical system, conjugate with the focal plane of the microscope objective, in this example by means of an optic 33 forming, with the microscope objective 30, a setup 4f. Let $r_{out}$ denote a point of the image plane ImP, defined by its Cartesian coordinates ($x_{out}$, $y_{out}$).

The distortion matrix corresponds, in a correction basis defined between a conjugate plane of said focal plane and an aberration correction plane, to the term-by-term matrix product of a reflection matrix of said field of view determined in said correction base, with the phase conjugate matrix of a reference reflection matrix, defined for a model medium, in said correction base.

Figure 2:
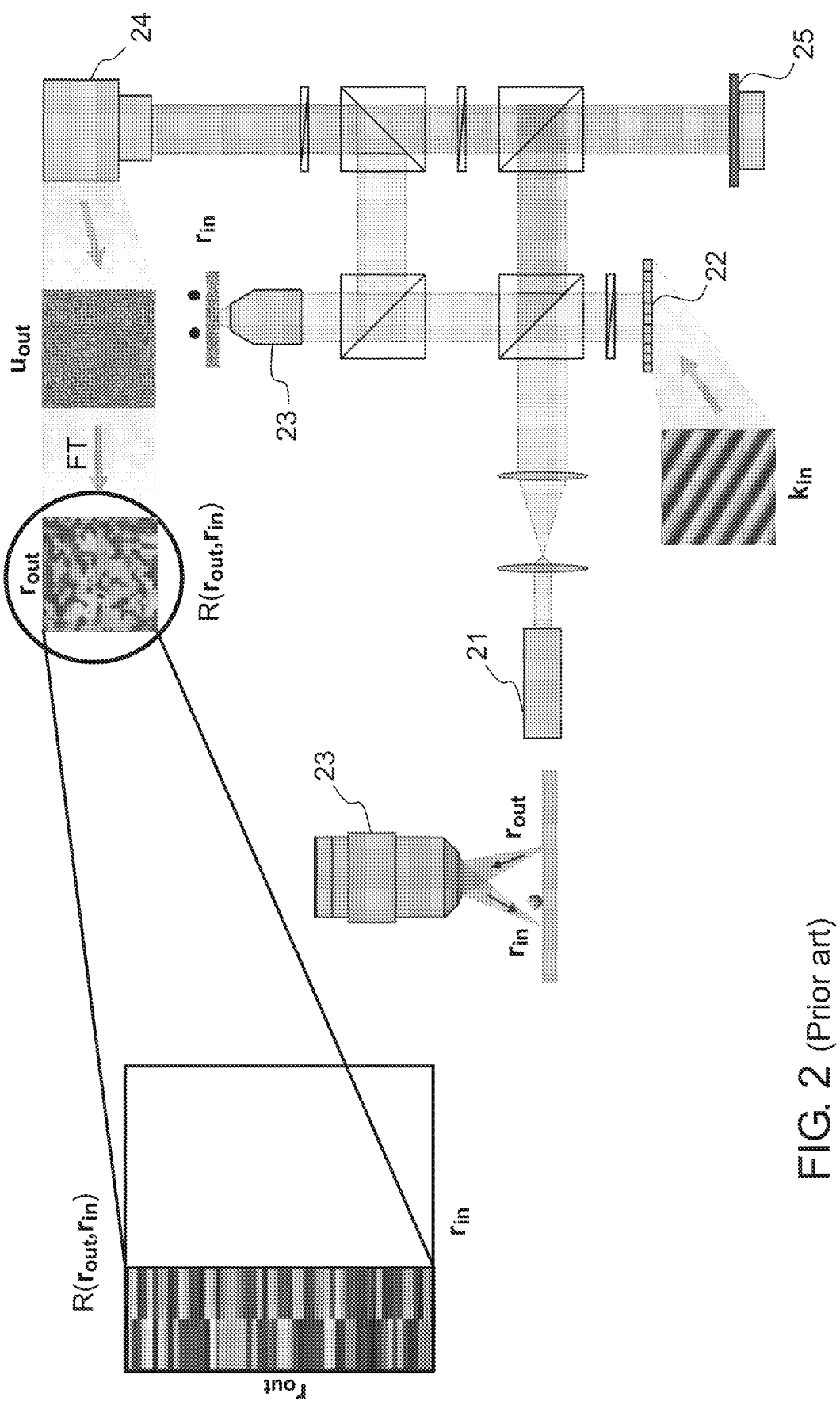
FIG. 2 (already described) schematically shows an experimental system for imaging through scattering media, according to the prior art.

Experimentally, the reflection matrix may be measured actively, as explained with reference to FIG. 2 of the prior art, by using, on emission, a spatial light modulator (SLM) illuminated by a spatially coherent light source. The cross-interference term between the field reflected by the sample in the observation plane and a reference field may then be measured on a CCD or CMOS camera by means of interferometric techniques ("four-image phase shifting" method, off-axis holography, etc.). The reflection matrix thus corresponds in this case to the set of impulse responses between each pixel of the SLM and each pixel of the camera.

Note that it is also possible to form the interferograms in the frequency domain (using a spectrometer coupled to a CCD or CMOS camera, for example). It is then possible to measure the reflection matrix in the Fourier domain and then reconstruct the reflection matrix for each depth in the medium by summing over a given spectral band. In this case, the deep scanning of the sample is obtained by recombining the matrices obtained at different frequencies rather than by means of a motorized translation of the sample along the optical axis.

The distortion matrix may then be calculated numerically on the basis of the reflection matrix. However, as will be described in more detail below, the distortion matrix may also be determined experimentally directly, without prior determination of the reflection matrix.

Furthermore, the reflection matrix and/or the distortion matrix may be measured and studied between different planes of the optical assembly, and in the remainder of the description, reference will be made to the reflection and/or distortion matrix regardless of the basis used. Thus, the reflection and/or distortion matrix may be defined for example in the pupil plane on emission (InP) and the pupil plane on reception (OutP), or conjugate planes, if the SLM and the CCD camera have their surfaces conjugate with the pupil of the microscope objective through which it is sought to image the sample. The reflection and/or distortion matrix may also be defined between source (SP) and receiver (ImP) planes conjugate with the plane of the object to be imaged. Lastly, the reflection and/or distortion matrix may connect what are called "reciprocal" planes: pupil plane on emission and plane conjugate with the plane of the object on reception and vice versa. In the present description, one or the other of these bases may be used, the transition from one plane to the other being able to be performed by matrix operations comprising simple discrete spatial Fourier transforms.

It should also be noted that, in the present description, the reflection matrices and/or the distortion matrices measured experimentally are generally measured between 2D arrays of sensors (for example an SLM and a CCD camera). The measured matrices therefore have a 4D structure. In order to manipulate and represent these matrices, the 2D arrays of sensors are concatenated according to input and output vectors, so that the reflection and/or distortion matrices ultimately take a two-dimensional form that is easier to manipulate and visualize.

Figure 3A:
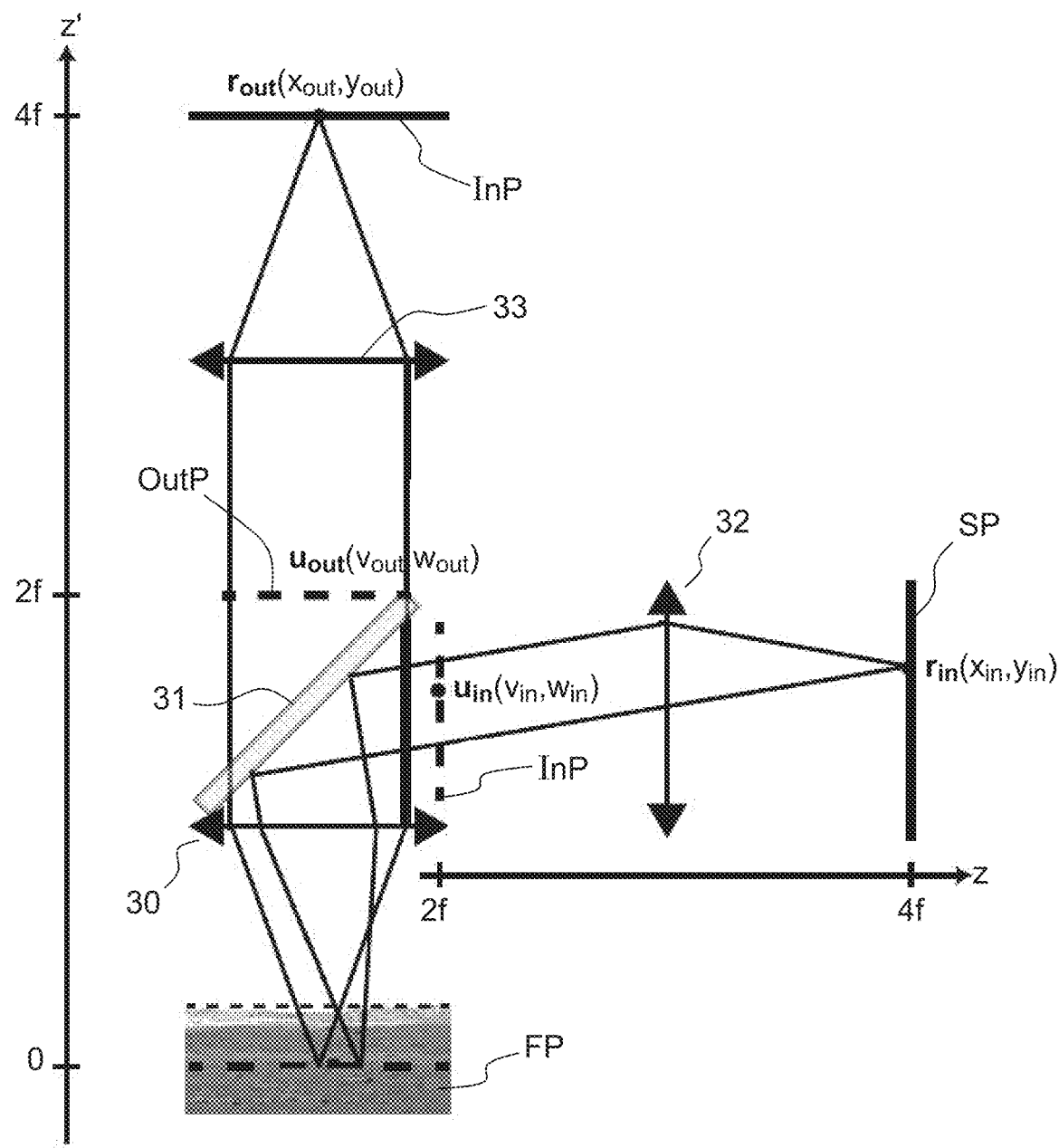
FIG. 3A shows a simplified diagram of a system according to the present description allowing the various notations to be introduced and FIG. 3B shows a diagram illustrating the convention used for the representation of four-dimensional matrices.
Figure 3B:
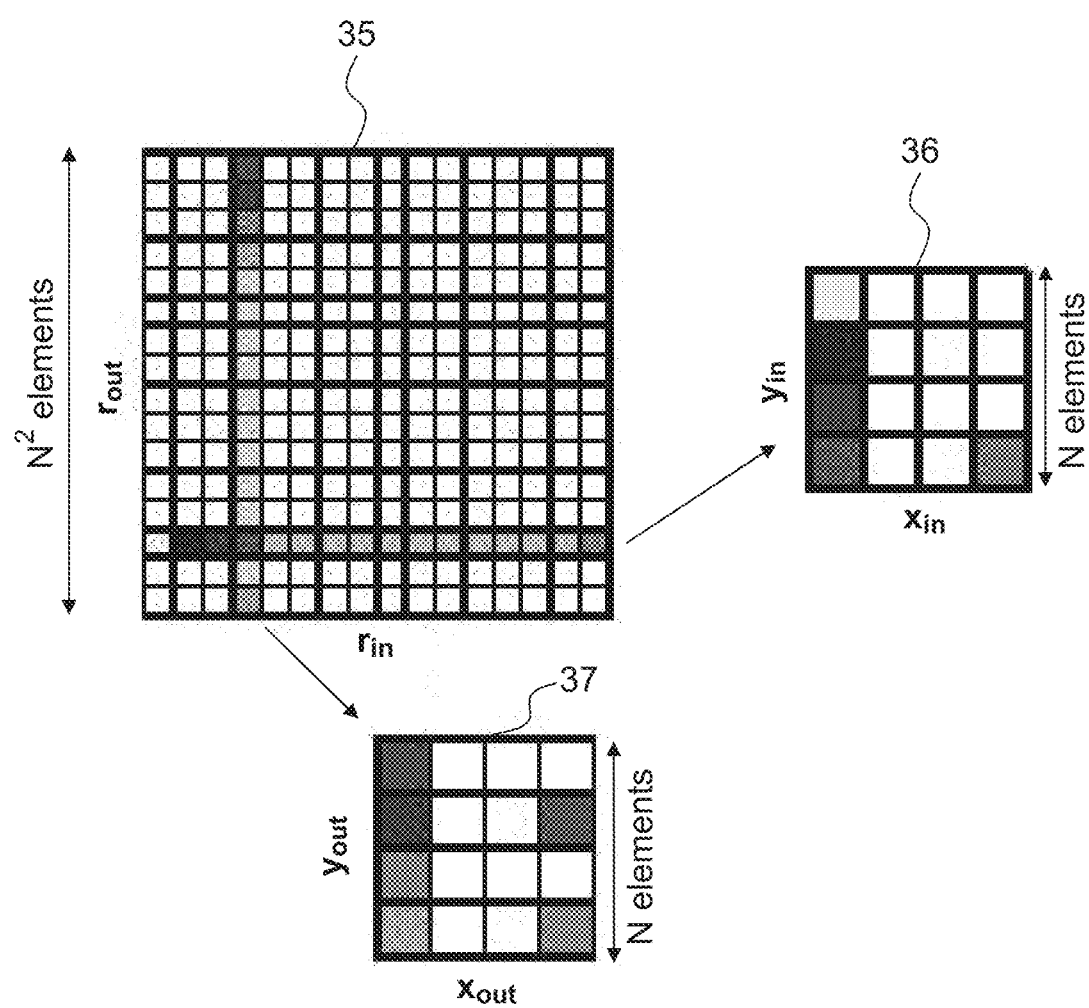

FIG. 3B illustrates, by way of example, the concatenation of a matrix on the basis of input vectors 36 with N×N elements (SLM) and output vectors 37 with N×N elements (CCD) to form a matrix 35 with $N^2 \times N^2$ elements. The $N^2$ elements of each input vector $r_{in}$, 36 are arranged on a column of the matrix 35 while the $N^2$ elements of each output vector $r_{out}$ 37 are arranged on a row of the matrix 35.

Figure 4:
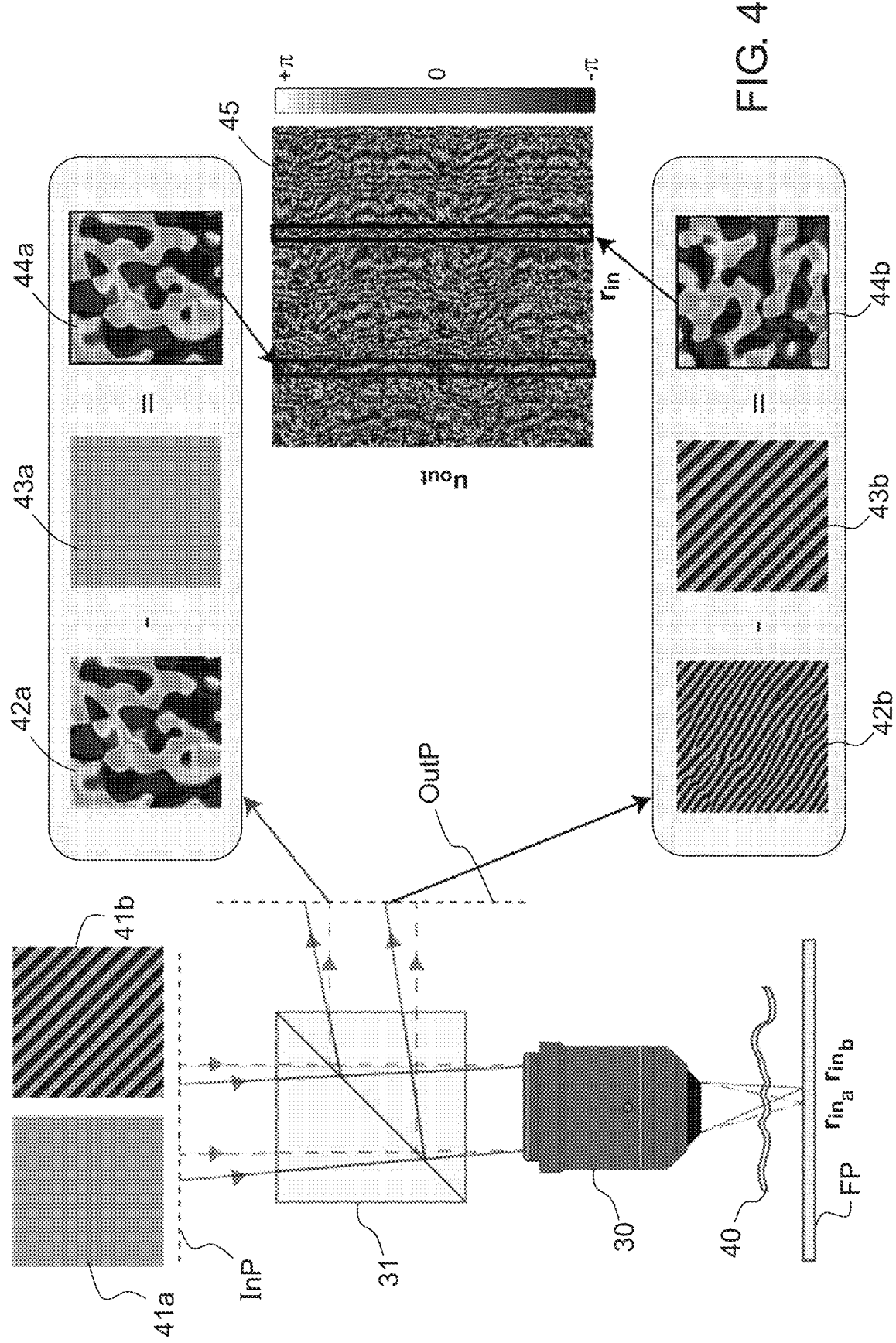
FIGS. 4 and 5A-5D show diagrams explaining the distortion matrix concept.

FIG. 4 illustrates, by means of a simplified diagram, the concept of the distortion matrix.

A simplified diagram of a system for characterizing a sample, similar to that of FIG. 3A, is illustrated on the left-hand side of FIG. 4. In this example, a first incident light wave, characterized in the entrance pupil InP of the microscope objective 30 by a first transverse mode $41_a$, is applied for example by means of an SLM (not shown) so as to be focused in the focal plane of the microscope objective. This transverse mode is focused at a focus point of the focal plane FP, conjugate with a point $r_{ina}$ of the source plane SP (not shown). A second incident light wave, characterized in the entrance pupil InP of the microscope objective 30 by a second transverse mode $41_b$, is focused at a focus point of the focal plane FP, conjugate with a point $r_{inb}$ of the source plane SP. The reflected electromagnetic field is measured in the Fourier space (in this example the exit pupil plane OutP) by a CCD camera (not shown), for example by means of known interferometry techniques (not shown). Images $42_a$ and $42_b$ illustrate, respectively, the phase of the reflected electromagnetic field for the entrance points $r_{ina}$ and $r_{inb}$. These two-dimensional fields are identified by the vector $u_{out}$. After concatenation, they form two columns of a reflection matrix $R_{ur}$ (not shown), determined between the exit pupil plane OutP and the source plane SP. Each column of this matrix $R_{ur}$ thus corresponds to the electromagnetic field reflected in the pupil plane OutP (identified by $u_{out}$) for an incident wave focused at a point $r_{in}$ of the focal plane.

The reflected electromagnetic field has a geometric component (plane wave), the projection of which on the CCD camera is illustrated, respectively, by images $43_a$ and $43_b$ for the entrance focus points $r_{ina}$ and $r_{inb}$, and a distorted component resulting, for example, from passing through an aberrator shown schematically in FIG. 4 by the aberrating layer 40. Images $44_a$ and $44_b$ illustrate the distorted component of the wavefront for each of the reflected electromagnetic fields $42_a$ and $42_b$. After concatenation, these distorted components of the wavefront $44_a$ and $44_b$ form two columns of the distortion matrix $D_{ur}$ (image 45 of FIG. 4). The columns of the distortion matrix $D_{ur}$ are thus formed of the distorted component of the electromagnetic fields reflected by different focus points $r_{in}$ of the field of view, measured in the observation plane and identified by the vector $u_{out}$.

In practice, to isolate the distorted component of the reflected wavefront, there is subtracted from the phase of the reflected electromagnetic field that which would be obtained ideally in the absence of aberrations, for a model medium, as illustrated in FIGS. 5A-5D.

Figures 5A, 5C:
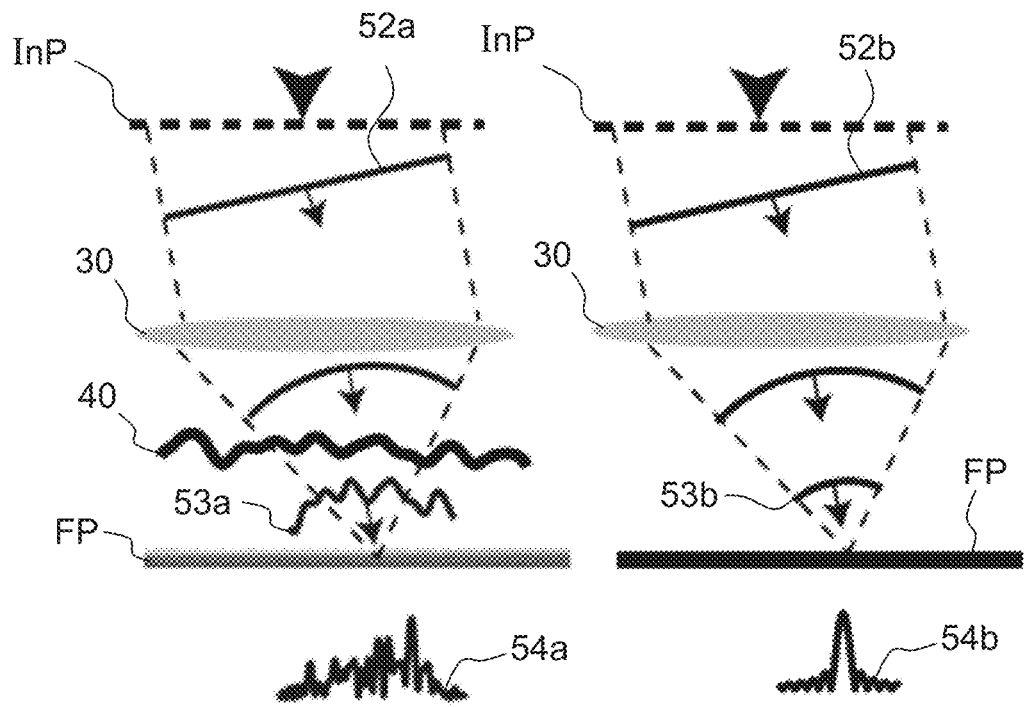
Figures 5B, 5D:
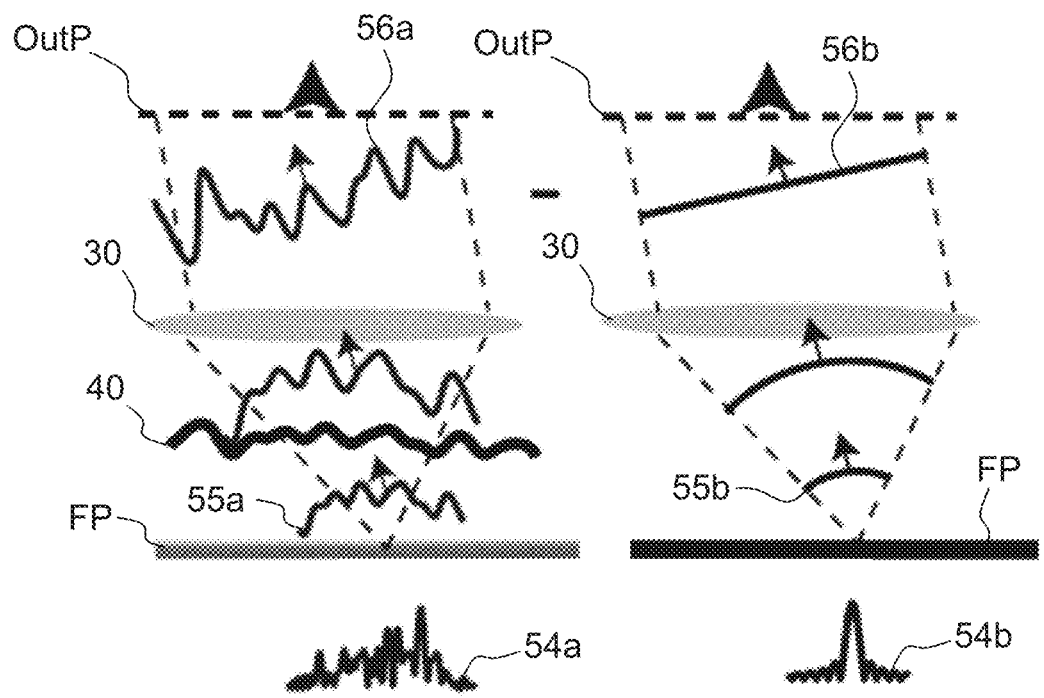

As illustrated in FIG. 5A, in the presence of an aberrator 40, an emitted incident wavefront $52_a$ formed so as to focus in the focal plane FP of the microscope objective 30 at a focus point $r_{in}$ is distorted by the aberrator film (wavefront $53_a$) and gives rise to an aberrated focal spot $54a$ in the focal plane FP. This incident field is reflected by the medium (FIG. 5B). The reflected wavefront $55_a$ passes through the aberrator film once again and is then measured in the pupil plane OutP (wavefront $56_a$), for example by means of interferometric techniques. This reflected field, $R(u_{out}, r_{in})$, has a geometric component linked to diffraction and a distorted component linked to the aberrator. To separate these two components, imagine the same experiment without the aberrator, with a reference medium and a plane mirror in the focal plane (FIGS. 5C, 5D). The same incident wavefront $52_b$ is formed so as to focus at the focus point $r_{in}$ and gives rise to a non-aberrated focal spot $54_b$ in the focal plane FP. This incident field is reflected by the mirror in the focal plane (FIG. 5D). The reflected wavefront $55_b$ is finally determined in the pupil plane OutP (wavefront $56_b$). By subtracting the phase of this ideal field from that of the field measured experimentally, the distorted component of the field, $D(u_{out}, ran)$, is extracted, which will form a column of the matrix $D_{ur}$. By repeating this operation for each point of the focal plane, the distortion matrix $D_{ur}$ is obtained.

In the case where the model medium is homogeneous and a perfect mirror is placed in the focal plane, the ideally received field $56_b$, which is denoted by $G_0(u_{out}, r_{in})$, contains only the geometric component linked to diffraction and is nothing other than a plane wave. $G_0$ is nothing other than the propagation matrix between the source plane SP and the pupil plane OutP, with.

$$G_0(u_{out}, r_{in}) = \frac{e^{j\varphi_0}}{j\lambda f} e^{-j\frac{2\pi}{\lambda f} u_{out} \cdot r_{in}} \quad (1)$$

where j is the imaginary unit, $\varphi_0$ is a constant phase term, f is the focal length of the microscope objective and $\lambda$ the wavelength of the incident wavefront. Equation (1) reflects the spatial Fourier transform relationship between the field from the source plane SP (and its conjugate planes) and the exit pupil plane OutP.

Thus, the distortion matrix D may be constructed in the observation plane by means of the following Hadamard matrix product (i.e. the term-by-term matrix product):

$$D_{ur} = R_{ur} \circ G_0^* \quad (2)$$

where $G_0^*$ is the phase conjugate matrix of $G_0$ and $\circ$ represents the term-by-term matrix product (Hadamard matrix product). To recall, the elements of the phase conjugate matrix $G_0^*$ of the matrix $G_0$ are complex numbers having the same modulus as the coefficients of $G_0$ but an opposite argument.

In the case of an inhomogeneous model medium, the expression of $G_o$ becomes more complicated than that given in equation (1). For example, in the case of a multilayer medium of variable optical index, the matrix $G_0$ may be calculated analytically by a matrix product between the different transmission matrices associated with the propagation of the wave in each of the layers. For a more complicated model medium, typically one that is not translation invariant (e.g. curved interface), the matrix $G_0$ may be determined by means of a numerical simulation or a semi-analytical calculation.

The distortion matrix may also be studied in the focal plane. A "focal plane" distortion matrix $D_{rr}$ may be obtained on the basis of the distortion matrix expressed in the observation plane $D_{ur}$ via the following basis change:

$$D_{rr} = G_0^\dagger D_{ur} \quad (3)$$

i.e. in terms of matrix coefficients $$D(r_{out}', r_{in}) = C\Sigma_{u_{out}} D(u_{out}, r_{in}) \exp[j(2\pi/\lambda f) u_{out} \cdot r_{out}'] = R(r_{out} - r_{in}, r_{in}) \quad (4)$$

where the exponent † denotes the conjugate transpose matrix operation and C is a constant. The columns of $D_{rr}$ correspond to the field reflected in the image plane recentered on the focus point $r_{in}$. The matrix Dr therefore gives the variation in the reflection point spread function of the imaging system at each point of the field of view, the point spread function being the impulse response of the imaging system, that is to say the focal spot recentered on the point of illumination. As will be described below, this makes it possible to quantify and characterize the aberrations caused by the sample upstream of the focal plane.

To go further in the analysis of the distortion matrix $D_{ur}$, it is advantageously possible to consider, on the one hand, the case of a reflection by the sample that is mainly specular and, on the other hand, the case of a reflection that is mainly random scattering. These two modes may be discriminated by the spatial variation scale L characteristic of the disorder potential associated with the heterogeneous medium as a function of a parameter $\delta_A$ which represents the characteristic size of the aberrated focal spot. More precisely, in the case of an aberrator that can be modeled as a two-dimensional random phase screen, $\delta_A$ may be written as.

$$\delta_A \sim \frac{\lambda z}{l_C} \quad (5)$$

where $l_c$ is the coherence length of the aberrator and z is the distance between the aberrator plate and the focal plane PF. If $L > \delta_A$, it is possible to make the approximation of a specular reflection mode (often the case in the mode of optical wavelengths). In the opposite case, the sample causes a random scattering reflection. In practice, it is often an intermediate case which combines random scattering reflection and specular reflection. In the specular case, the distortion matrix $D_{ur}$ visually presents correlations between its columns. As will be described below, these correlations correspond to the repetition of the same distortion pattern for the wavefronts coming from the same isoplanatic domain. For a sample causing a random scattering reflection, for example of speckle type (random distribution of unresolved scatterers), it is possible to study the normalized correlation matrix of the distortion matrix $D_{ur}$ in order to reveal these same correlations. Whichever the case, as will be described in more detail below, searching for the invariants of the matrix $D_{ur}$, for example by means of a singular value decomposition (SVD), makes it possible to extract the complex transmittance of the aberrator for each point of the focal plane and thus optimally correct the aberrations in each isoplanatic domain contained in the field of view.

Figure 6A:
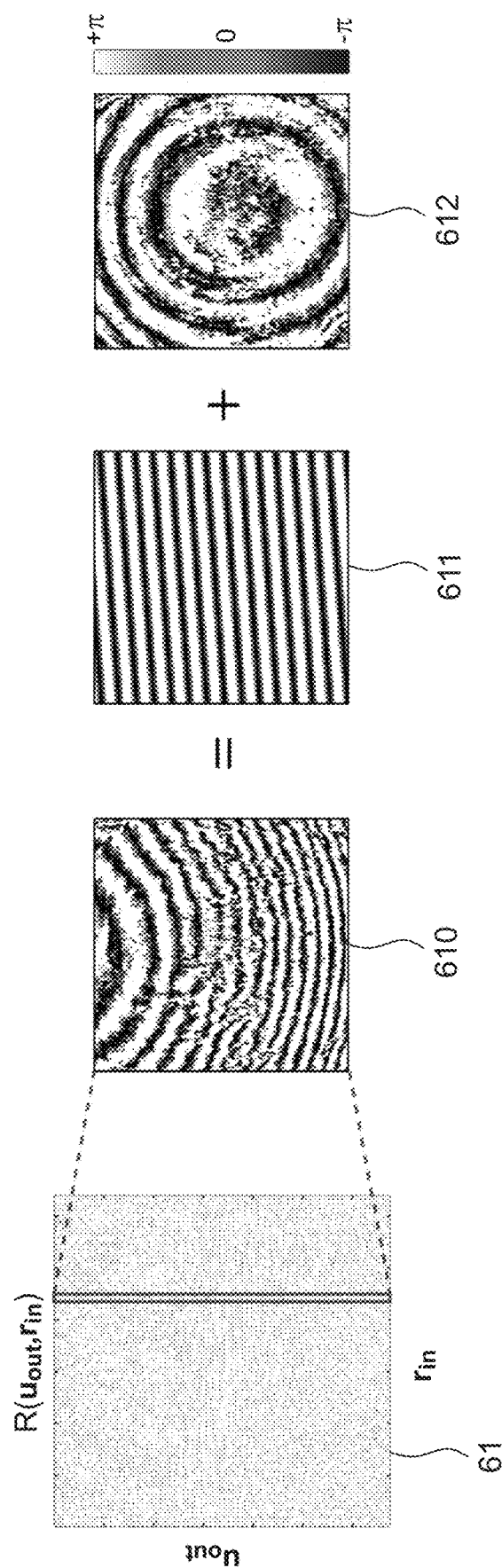
Figure 6B:
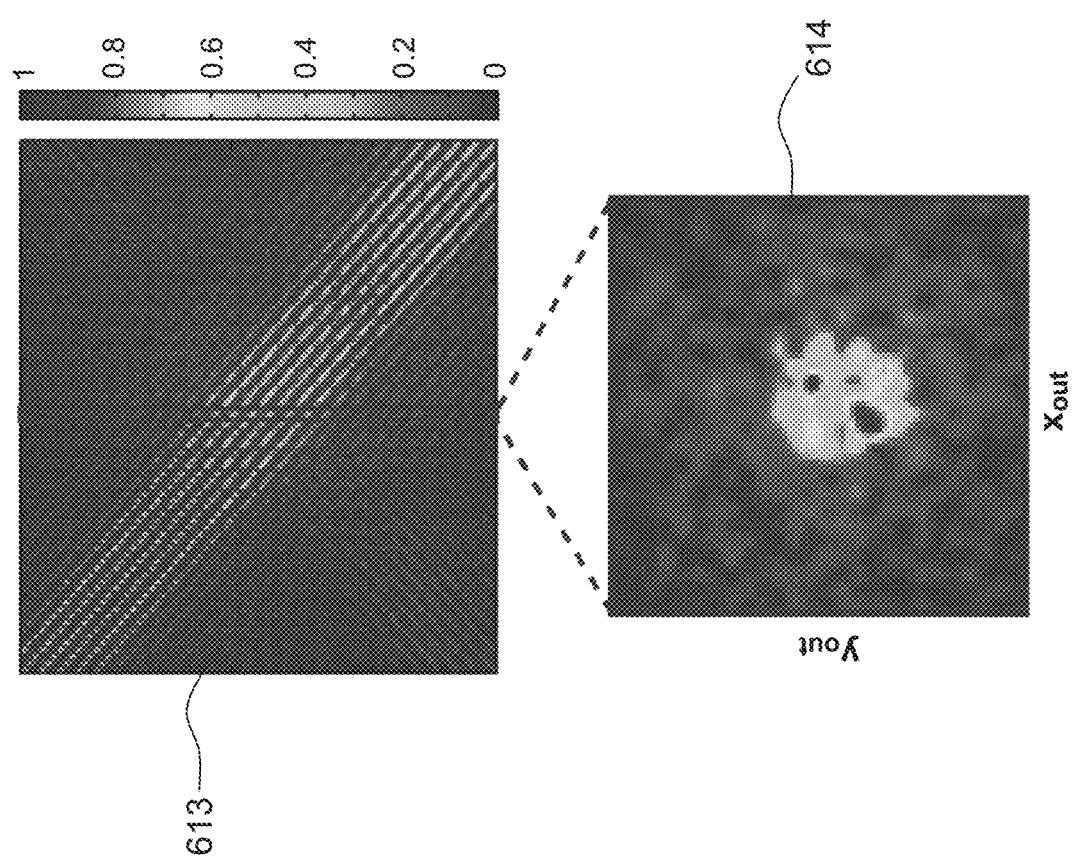

FIGS. 6A to 6C illustrate, respectively, an exemplary reflection matrix, the corresponding focal plane reflection matrix and the distortion matrix which are determined experimentally in the case of a sample causing a specular reflection (resolution test pattern) and for a 10 μm defocus defect. The experimental device is that described in FIG. 2. The field of view of 250×250 μm² is scanned using N=3136 focused illuminations (spatial resolution of 4.5 μm).

FIG. 6A illustrates the phase of the reflection matrix $R_{ur}$ (image 61) measured between the focal plane on emission (SP) and the pupil plane on reception (OutP). Each column of this matrix contains the field reflected in the pupil plane for an illumination at a given point $r_{in}$. Image 610 shows the phase of this complex field corresponding to a column of $R_{ur}$. The phase measured here differs greatly from the phase of the field expected in an ideal case, $G_0(u_{out}, r_{in})$ (611). To isolate the distortion of the wavefront linked to aberrations, the expected ideal phase (611) may be subtracted from the experimentally measured phase (610). The phase mask thus obtained (612) corresponds to a column of the distortion matrix $D_{ur}$ (equation 2). It collects together the aberrations experienced by the incident wave and the reflected wave through the microscope objective. Here, these are Fresnel rings characteristic of a defocus defect.

The focal plane reflection matrix $R_{rr}$ is shown (as a modulus) in FIG. 6B (image 613). The focal plane reflection matrix is obtained on the basis of the reflection matrix $R_{ur}$ measured between the focal plane on emission (SP) and the pupil plane on reception (OutP) just by changing base. The focal spot (image 614) for focusing the incident wave at the center of the field of view is obtained from the central column of the focal plane reflection matrix $R_{rr}$. The dispersion of energy outside of the diagonal of $R_{rr}$ (image 613) and the spread of the focal spot (image 614) beyond one pixel (i.e. a resolution cell) illustrate and quantify the level of the aberrations present in the experiment described here.

The phase of the distortion matrix $D_{ur}$ formed on the basis of the reflection matrix $R_{ur}$ is shown in FIG. 6C (image 62). It exhibits substantial correlation whether along its rows or its columns, as evidenced by the closeup of some of its elements, shown in image 621. The correlation along the columns is linked to the fact that the distortion of the wavefront and the reflectivity of the object vary slowly as a function of the focus point ran. Images 622 and 623 show the phase distortions associated with two distinct columns of $D_{ur}$ shown in two-dimensional form. The similarity between these two images evidences the spatial invariance characteristic of a defocus defect. This means that these points of the field of view are associated with the same wavefront distortion; in other words, they are located in the same isoplanatic domain. The correlations between the rows of the matrix $D_{ur}$ are inherent to the deterministic nature of the aberration law (Fresnel rings) associated with a defocus defect.

Still assuming a sample causing a specular reflection, examplary uses of the distortion matrix to determine a mapping of one or more aberration laws in the observation plane, in particular to establish a mapping of the reflectivity of the sample, are described below.

For this, the invariants of the distortion matrix are sought, in other words the aberration laws that are spatially invariant on the isoplanatic domains of the field of view. Various methods are known to those skilled in the art for searching for the invariants of such a matrix, such as for example singular value decomposition (or "SVD") or principal component analysis ("PCA").

Singular value decomposition is a powerful tool for extracting the correlations between the rows or columns of a matrix. Mathematically, the SVD of the matrix $D_{ur}$, size $N^2 \times N^2$, is written as follows:

$$D_{ur} = U \times \Sigma \times V^\dagger \quad (6)$$

U and V are unit matrices of size $N^2 \times N^2$ the columns $U_i$ and $V_i$ of which correspond to the output and input eigenvectors. The exponent † denotes the conjugate transpose matrix. Each output eigenvector $U_i$ is defined in the pupil plane identified by the vector $u_{out}$. Each input eigenvector $V_i$ is therefore defined in the focal plane identified by the vector r. $\Sigma$ is a matrix of size $N^2 \times N^2$ only the diagonal elements of which are non-zero:

$$\Sigma = \mathrm{diag}(\sigma_1, \sigma_2, \ldots, \sigma_{N^2}) \quad (7)$$

The diagonal elements of the matrix $\Sigma$ are the singular values $\sigma_i$ of the matrix $D_{ur}$ which are real, positive and ranked in descending order:

$$\sigma_1 > \sigma_2 > \ldots > \sigma_{N^2} \quad (8)$$

The coefficients $D(u_{out}, r_{in})$ of the matrix $D_{ur}$ are therefore written as the following sum:

$$D(u_{out}, r_{in}) = \Sigma_{i=1}^{N^2} \sigma_i U_i(u_{out}) V_i^*(r_{in}) \quad (9)$$

SVD primarily decomposes a matrix into two subspaces: a signal subspace (a matrix characterized by substantial correlations between its rows and/or its columns) and a noise subspace (a random matrix without correlation between its rows and columns). The signal subspace is associated with the largest singular values while the noise subspace is associated with the smallest singular values. On the one hand, the SVD of D will therefore make it possible to filter the noise subspace which contains both the experimental noise and the incoherent contribution of the reflected field caused by multiple scattering events. On the other hand, each singular state of the signal subspace will make it possible to extract, according to the output eigenvector $U_i$, the distortion undergone by the wave in the pupil plane for each region of the image which will itself be identified by the input eigenvector $V_i$.

FIGS. 7A-7C illustrate, respectively, the spectrum of the normalized singular values, the phase of the first output eigenvector Ur and the modulus of the first input eigenvector $V_1$ assuming a defocus defect, under the experimental conditions described above (FIGS. 6A-6C) and on the basis of the distortion matrix $D_{ur}$ shown in image 62 (FIG. 6C).

As illustrated in FIG. 7A, the distribution of normalized singular values is dominated by the first singular value $\sigma_1$. The associated eigenvectors, $U_1$ and $V_i$, are shown in FIGS. 7B (phase of $U_1$) and 7C (modulus of $V_i$). In the case of a defocus defect, the distortions of the wavefront do not vary as a function of the focus point in the field of view. In other words, the field of view contains only one isoplanatic domain. In the case of a specular reflection, it is possible to show that the output eigenvector U gives the distortion caused by the aberrator cumulatively going out and on return:

$$U_1(u_{out}) = A(u_{out}) A(u_{in}) \delta(u_{out} + u_{in}) \quad (10)$$

with $A(u_{out})$ and $A(u_{in})$ the distortions undergone by the wavefront going out and on return and projected into the pupil plane (identified by the vector u). The Dirac distribution $\delta$ in the preceding equation reflects the fact that, in specular reflection mode, a wave coming from a point $u_{in}$ in the pupil plane at entrance will give rise to a reflected wave focused at $u_{out} = -u_{in}$ at exit. In FIG. 7B, the phase of the first output eigenvector $U_1$ indeed takes the form of Fresnel rings which is characteristic of an aberration law associated with a defocus defect. Additionally, it is possible to show that the input eigenvector $V_1$ gives, for its part, direct access to the reflectivity $\rho$ of the object:

$$V_1(r_{in}) = \rho(r_{in}) \quad (11)$$

FIG. 7C shows the image of the object given by the input eigenvector $V_1$. This corrected image is to be compared with the original image subject to the defocus defect shown in FIG. 8C.

The measured reflection matrix $R_{ur}$ (61, FIG. 6A) may be corrected by phase conjugation of the distortion of the wavefront extracted along the output eigenvector $U_1$. Physically, the phase conjugation operation consists in re-emitting a wavefront modulated by a phase opposite that of the measured distortion. This operation then makes it possible to compensate perfectly for the phase distortions accumulated by the wave on its outward and return journeys. Mathematically, the phase conjugation operation is performed here by applying the following correction to the matrix $R_{ur}$:

$$R_{ur}' = \exp(-j \times \arg\{U_1\}) \circ R_{ur} \quad (12)$$

where $\arg\{U_1\}$ denotes the phase of $U_1$.

A corrected matrix $R_{rr}'$ may then be deduced from $R_{ur}'$ by changing basis at exit from the pupil plane (OutP) to the image plane (ImP). A corrected confocal image I' may be deduced from the diagonal ($r_{in}=r_{out}$) of the matrix $R_{rr}'$:

$$I'(r_{in}) = R'(r_{in}, r_{in}) \quad (13)$$

$I'(r_{in})$ is then a reliable estimator of the reflectivity $\rho(r_{in})$ of the sample.

Figures 8A, 8B:
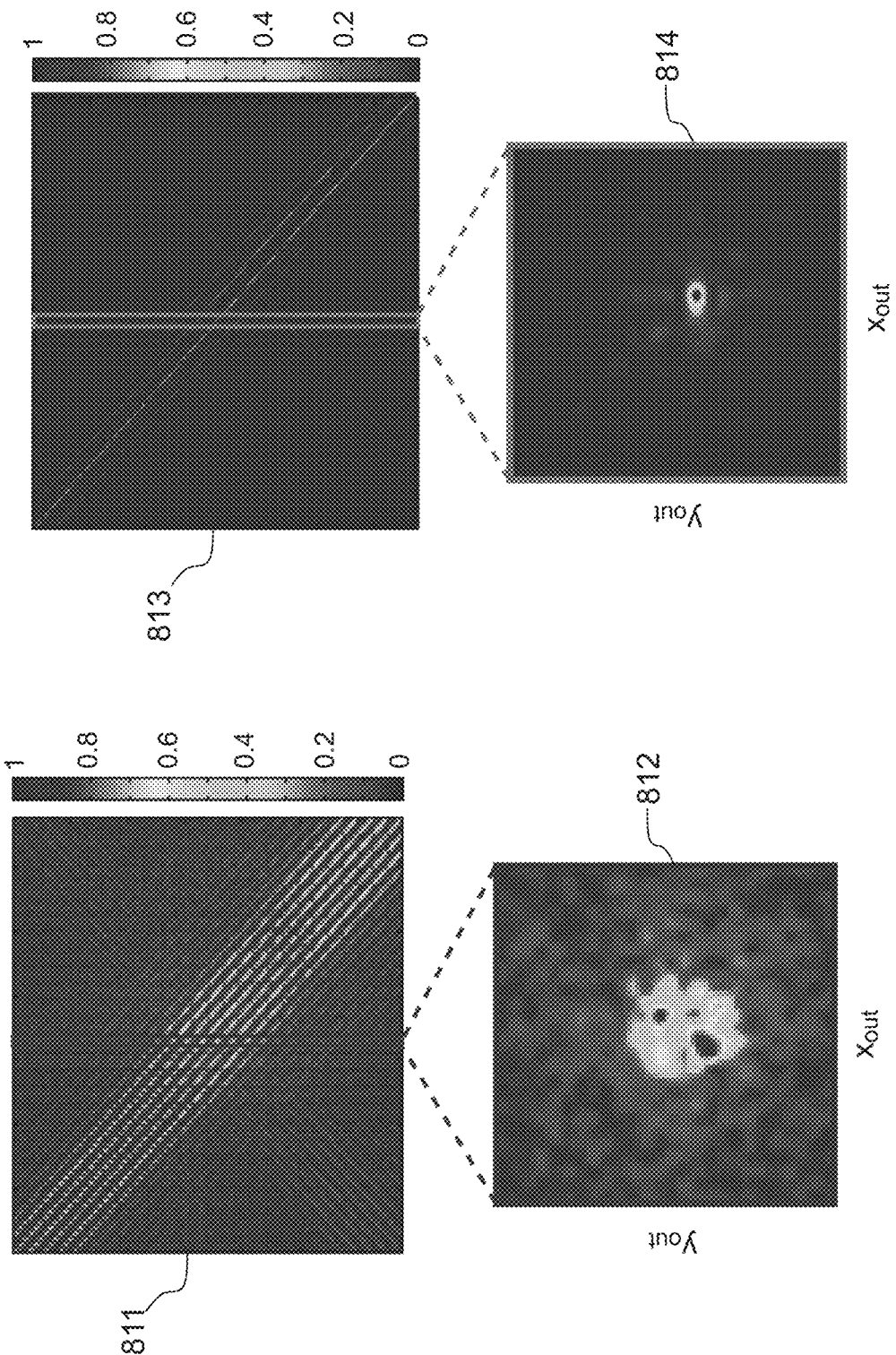
FIGS. 8A-8D illustrate, respectively, (FIGS. 8A, 8B) the focal plane reflection matrices before and after correction and (FIGS. 8C, 8D) the confocal images deduced from the two matrices, for the same example as that illustrated by means of FIGS. 6A 6C (a single isoplanatic domain)
Figure 8D:
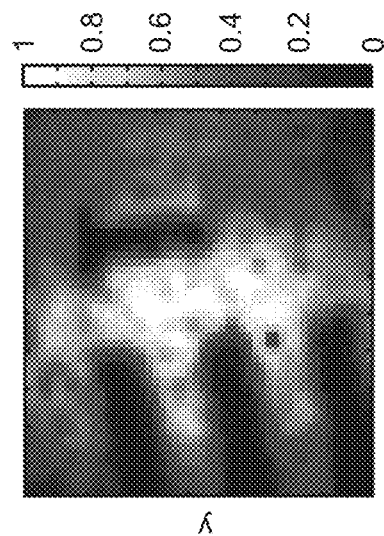
Figure 8C:
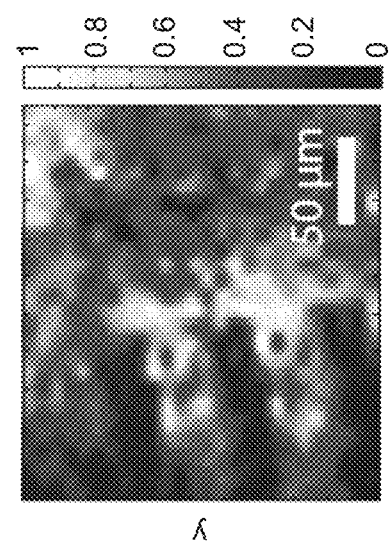

FIGS. 8A to 8D illustrate the effects of this correction by comparing the reflection matrices before and after correction, respectively, as well as the confocal images obtained in each case. FIG. 8A compares the focal plane reflection matrix $R_{rr}$ before correction (image 811) and the reflection matrix $R_{rr}$ (image 813) after application of the vector $\exp(-j \arg\{U_1\})$ from the pupil plane at exit. The concentration of energy around the diagonal of $R_{rr}'$ in comparison with $R_{rr}$ shows the effect of correcting for aberrations. The focal spot 812 deduced from a column of the reflection matrix $R_{rr}$ (image 811) is compared with the focal spot 814 (FIG. 8B) deduced from the same column of the corrected reflection matrix $R_{rr}'$ (image 813). Obtaining a focal spot (image 814), the size of which is only limited by diffraction, also evidences the quality of the aberration correction. The confocal image (FIG. 8D) deduced from the corrected matrix $R_{rr}'$ is compared with the starting confocal image (image 8C) deduced from the matrix $R_{rr}$. The image obtained (FIG. 8D) is of equivalent quality to the image provided by the vector $V_1$ (FIG. 7C). FIG. 8 thus illustrates the success of the approach for imaging a specular object in the presence of aberrations.

In the previous example, illustrated by means of FIGS. 6 to 8, an example of the experimental determination and analysis of a distortion matrix has been seen, comprising in particular the calculation of an aberration law for a defocus defect: the field of view contained only one isoplanatic domain. Now of interest is a general case for which the field of view includes a plurality of isoplanatic domains.

FIGS. 9A to 9D illustrate an example in which the aberrator is formed in this instance by a plastic film. As illustrated in inset 90 of FIG. 9A, a plastic aberrator film 40 is positioned between the microscope objective 30 and the focal plane FP at the level of which is arranged the sample (resolution test pattern).

The rough and irregular surface of the plastic film results in substantial distortions of the incident and reflected wavefronts. A measurement of the reflection matrix is performed for N=441 incident illuminations making it possible to image a field of view of 240/240 $\mu m^2$ with a spatial interval $\delta r=12$ $\mu m$.

The effect of the aberrator is particularly visible on the reflection matrix $R_{rr}$ measured in the focal plane (911, FIG. 9B). While in an ideal case this matrix is near-diagonal, here a substantial spread of the reflected field outside of this diagonal is observed. Under these conditions, the point spread function of the imaging system is heavily degraded, as evidenced by the random aspect of a characteristic focal spot (FIG. 9B, 911) deduced from the matrix $R_{rr}$. The confocal image (FIG. 9B, 913) deduced from this reflection matrix also exhibits a totally random aspect, unrelated to the reflectivity of the resolution test pattern.

Figure 9D:
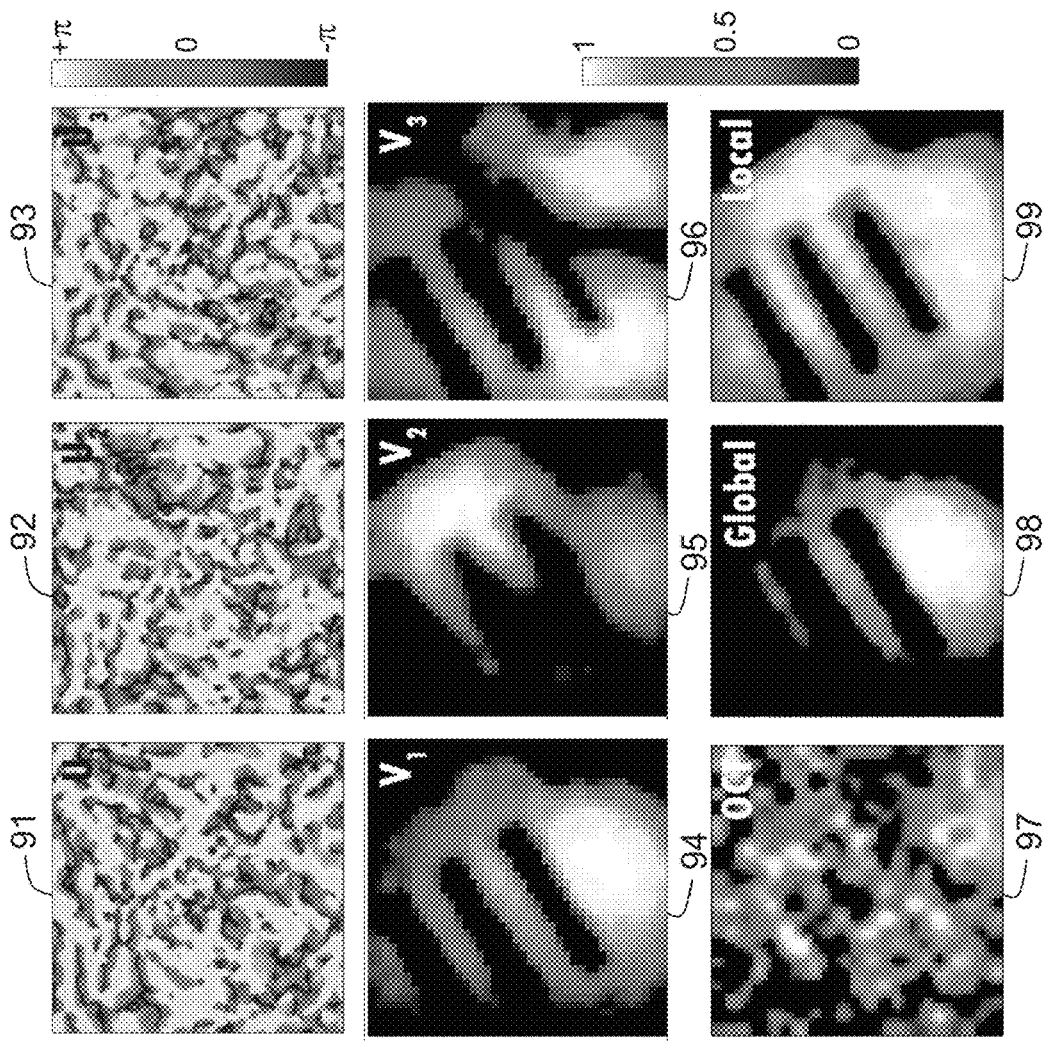
Figure 9C:
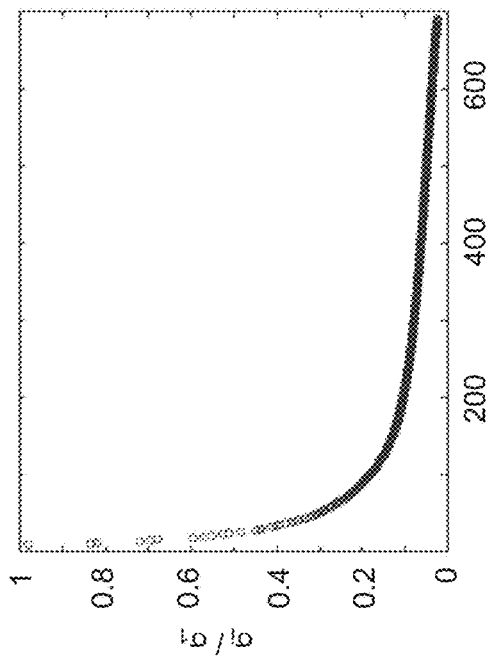

The distortion matrix deduced from $R_{ur}$ (equation 2) is analyzed in the form of an SVD. The spectrum of the singular values normalized by $\sigma_i$ is shown in FIG. 9C. A continuum of singular values is obtained, proof that a priori the field of view contains a plurality of isoplanatic domains. The three first eigenvectors in the pupil and focal planes are shown in images 91-93 and 94-96, respectively (FIG. 9C). The output eigenvectors $U_i$ show that the distortions caused by the wavefront are complex and associated with high spatial frequencies, unlike the case of the defocus defect [FIG. 7B]. The input eigenvectors $V_i$ decompose the object in the focal plane over different isoplanatic areas (images 94-96). They are therefore associated with different aberration laws $U_i$ in the pupil plane [images 91-93]. The linear combination of the moduli of the eigenvectors $V_i$ weighted by the associated eigenvalues $\sigma_i^2$ finally gives access to an image of the field of view corrected for the aberrations caused upstream $$|\rho(r_{in})|^2 = \sum_{i=1}^{Q} \sigma_i^2 |V_i(r_{in})|^2 \quad (14)$$

where Q is the number of isoplanatic domains contained in the field of view. The combination of the three first eigenvectors $V_i$ gives a high-contrast and well resolved image of the resolution test pattern (image 99). The comparison with the original confocal image (image 97) is striking and demonstrates the success of the approach. The benefits of local aberration correction (image 99) are also brought to light by the comparison with image 98 which would be obtained by means of conventional adaptive optics techniques (prior art).

Having dealt with the case of specular reflection which is typically caused by an extended object, the problem of random scattering reflection is now dealt with. Random scattering reflection is typically caused by a random distribution of under-resolved scatterers, a situation that is encountered in particular in biological tissues. An iterative approach (post-processing) to aberration correction, still based on the distortion matrix, is therefore suitable.

Step #0 of the process is equivalent to the specular case presented above. The matrix $R_{ur}$ is corrected at output by the conjugate of the phase of the first eigenvector $U_1$ of the distortion matrix $D_{ur}$ (equation 10). The resulting corrected matrix is denoted by $R_{ur}^{(1)}$. This initial step makes it possible to perform an overall correction for aberrations over the entire field of view.

Step #1 consists in recalculating a new distortion matrix $D_{ru}^{(1)}$ deduced from $R_{ru}^{(1)}$ defined this time between the entrance pupil plane and the exit focal plane. The random nature of the object now means that it makes more sense to study the correlation matrix of $D_{ru}^{(1)}$ in the pupil plane, namely $B^{(1)} = {}^t D_{ru}^{(1)} D_{ru}^{(1)*}$. A singular value decomposition of the phase of this matrix $B^{(1)}$, $\exp[j \arg\{B^{(1)}\}]$, gives a new set of eigenvectors $U_i^{(1)}$ that are associated with each isoplanatic area of the field of view. The corresponding reflection matrix may therefore be corrected this time at input:

$$R_{ru}^{(2)} = R_{ru}^{(1)} \circ \exp(-j \arg\{U_i^{(1)}\}) \quad (15)$$

The following steps consist in reproducing the same process by alternately correcting for residual aberrations at input (even iterations) and output (odd iterations). However, in each step, the correction is still performed with the first eigenvector $U_1^{(n)}$ of the phase of the correlation matrix, $\exp[j \arg\{B^{(n)}\}]$, of the distortion matrix in the pupil plane. Specifically, the choice of isoplanatism is made in step #1. Depending on whether the correction is at input or at output, the correlation matrix in the pupil plane $B^{(n)}$ is given by: $B^{(n)}=D_{ur}^{(n)}D_{ur}^{(n)\dagger}$ for even n (output) and $B^{(n)}={}^tD_{ru}^{(1)}D_{ru}^{(1)*}$ for odd n (input). In each step of the process, an image of the field of view may be deduced from the diagonal of the reflection matrix $R_{rr}^{(n)}$ expressed in the focal plane. In practice, a few iterations are sufficient to obtain an optimal correction for the selected isoplanatic area. An image of the entirety of the field of view may then be obtained by combining the corrections determined for each isoplanatic area.

FIG. 10 illustrates the benefits of the method according to the present description by means of a numerical simulation involving an object the reflectivity of which is that of a resolution test pattern in terms of absolute value but the phase of which is random, which causes a diffuse reflection mode. The reflection matrix is simulated for an aberrator generating an approximately fivefold enlargement of the focal spot and isoplanatic domains covering $\frac{1}{10}^{th}$ of the field of view. FIG. 10A shows the initial confocal image subject to aberrations. Figure JOB shows the confocal image of the reflection matrix R following step #0 which allows an overall correction for aberrations using the vector $U_1$. In the next step, the isoplanatic domains are selected by the rank i of the eigenvector $U_i^{(1)}$ of the normalized correlation matrix, $\exp[j \arg\{B^{(1)}\}]$. FIGS. 10C and 10D show the confocal images obtained following the iteration of the corrections for aberrations on the basis of the vectors $U_1^{(1)}$ and $U_2^{(1)}$. As expected, these images are associated with distinct isoplanatic domains of the field of view and give a faithful image of the object in each of these domains.

Knowledge of the aberration laws at each point of the sample may be put to good use not only for imaging but also to focus the light at any point of the sample. For example, on the experimental device of FIG. 2, it may be a matter of applying, to the SLM, a phase modulation bringing together: (1) the geometric phase law associated with the model medium for focusing on the target point; (2) the conjugate of the aberration law determined on the basis of the distortion matrix for the isoplanatic area containing the target point. In specular reflection mode, the aberration correction law applied will correspond to the phase of the output eigenvector $U_i$ of the distortion matrix $D_{ur}$ associated with the isoplanatic area $V_i$ containing the target point. In the random scattering case, it will be a question of bringing together according to a vector W all of the corrections for aberrations obtained at input of the sample:

$$W=\exp(-j[\arg\{U_i^{(1)}\}+\Sigma_{n=1} \arg\{U_1^{(2n+1)}\}]) \quad (16)$$

Beyond the reflectivity of the medium or knowledge of the aberration laws at each point of a sample, the distortion matrix makes it possible to perform 3D tomography of the optical index of the sample studied. From the "focal plane" distortion matrix Dcr, there is access to the point spread function in the sample as well as to the isoplanatic areas. Instead of directly correcting the images, the idea is to change the reference medium on which the calculation of the distortion matrix from the reflection matrix is based. This leads to an iterative approach to the distortion matrix in which the reference medium is made to change in the direction of a more complex model (e.g. multilayer medium) so as to decrease the spatial extent of the point spread function and increase the size of the isoplanatic areas. By going deeper and deeper into the sample, it is possible to gradually reconstruct a three-dimensional map of the refractive index, while obtaining an image of the reflectivity of the medium that is all the more faithful the closer the reference medium is to reality.

The "focal plane" distortion matrix $D_{rr}$ provides access to the point spread function of the imaging system at any point of the field of view. That being so, even after correcting for aberrations, a residual incoherent background remains on each column of the matrix $D_{rr}$. This incoherent background is caused by multiple scattering events occurring upstream of the focal plane. A multiple scattering rate $\gamma(r_{in})$ may therefore be measured locally on the basis of the ratio of the level of the incoherent background ($|r_{out}-r_{in}|>>\delta$) to the signal level on the central column of $D_{rr}$ ($r_{out}=r_{in}$):

$$\gamma(r_{in}) = \frac{\langle |D(r_{out} \neq r_{in}, r_{in})|^2 \rangle}{|D(r_{out} = r_{in}, r_{in})|^2} \quad (17)$$

Where the symbol $\langle \ldots \rangle$ denotes an average along each column of $D_{rr}$ apart from the central elements ($|r_{out}-r_{in}|>>\delta$). Additionally, by taking times longer than the ballistic time, for example by controlling the reference arm in the interferometer of FIG. 2, the point spread function may also make it possible to follow the growth of the diffusive halo within the medium and derive therefrom a local measurement of the transport parameters of the multiply scattered wave (scattering coefficient or mean free path of transport). Studying the diffusive halo at short times gives access to a much finer spatial resolution than that obtained by the prior art in random scattering optical tomography [A. Badon et al., Optica 3, 1160-1166, 2016].

According to one or more exemplary embodiments, the characterization method also comprises the identification and/or elimination of the specular component of the reflected field and/or of the multiple reflections arising between the various interfaces of the heterogeneous medium. Specifically, a reflector is never perfectly specular and its random scattering component will not then be corrected optimally by iterating equations (12) and (15). Furthermore, a specular reflector may cause multiple reflections between its interfaces which may blur the image. It is therefore necessary to be able to separate the specular and random scattering components of the field reflected by the medium. To this end, the distortion matrix may be projected into the basis defined by the aberration correction plane both at input and at output. A "Fourier plane" distortion matrix $D_{uu}$ may be obtained from the original distortion matrix $D_{ur}$ by means of the following basis change:

$$D_{uu}=D_{ur}{}^tG_0 \quad (18)$$

The previous equation is therefore rewritten in terms of matrix coefficients as follows:

$$D(u_{out}, u'_{in}) = C\sum_{r_{in}} D(u_{out}, r_{in})\exp\left[-j\frac{2\pi}{\lambda f}u'_{in}, r_{in}\right] = R(u_{out}, u_{in} + u_{out}) \quad (19)$$

The specular and multiply reflected components appear for precise pairs, $u_{in}$ and $u_{out}$, such that $$u_{in}+u_{out}=u \quad (20)$$

where $u/\lambda f$ is the spatial frequency of the specular object. u is for example zero if the specular reflector is arranged perpendicular to the optical axis. The specular and multiply reflected components may therefore be easily filtered and just the random scattering component (speckle) of the reflected field may be retained in order to precisely determine the aberrations caused and correct them. This discrimination of the random scattering component then allows direct access to the aberration laws to be applied iteratively at input and output in order to correct the reflection matrix and obtain an optimal image of the medium (iterating the corrections at output and input according to equations (12) and (15)), which is not possible if the specular component predominates [a single correction applied at output according to equation (12)]. In addition, the filtering of the distortion matrix in the Fourier plane makes it possible to eliminate the multiple reflections which contaminate, for example, the images in proximity to the interfaces (multiple echoes between interfaces of the medium).

As explained above, an experimental setup such as described in the article by A. Badon et al. cited in the "prior art" part of the present application may be used to determine a reflection matrix of the field of view in a basis defined between a conjugate plane of said focal plane and an observation plane, for example a plane conjugate with a pupil plane of the microscope objective. Each column of the reflection matrix then corresponds to the cross-interference term measured in the observation plane between the wave reflected by the sample and a reference wave for an incident wave focused at a given point of the focal plane. The distortion matrix may then be calculated on the basis of the reflection matrix thus determined and of a reference reflection matrix, as described above.

Of course, other setups known from the prior art may be used for the measurement of the reflection matrix. For example, in the article by Kang et al, ("Imaging deep within a scattering medium using collective accumulation of single-scattered waves" Nat. Photonics 9, 253-258 (2015)), an optical setup allows the measurement of the reflection matrix in the pupil plane at both input and output. It is possible to construct a distortion matrix on the basis of such a reflection matrix, by applying a basis change at input in order to project into a plane conjugate with the focal plane.

The applicants have also shown that it is possible to implement experimental setups allowing direct measurement of a first distortion matrix without going through the prior determination of a reflection matrix.

Figure 11A:
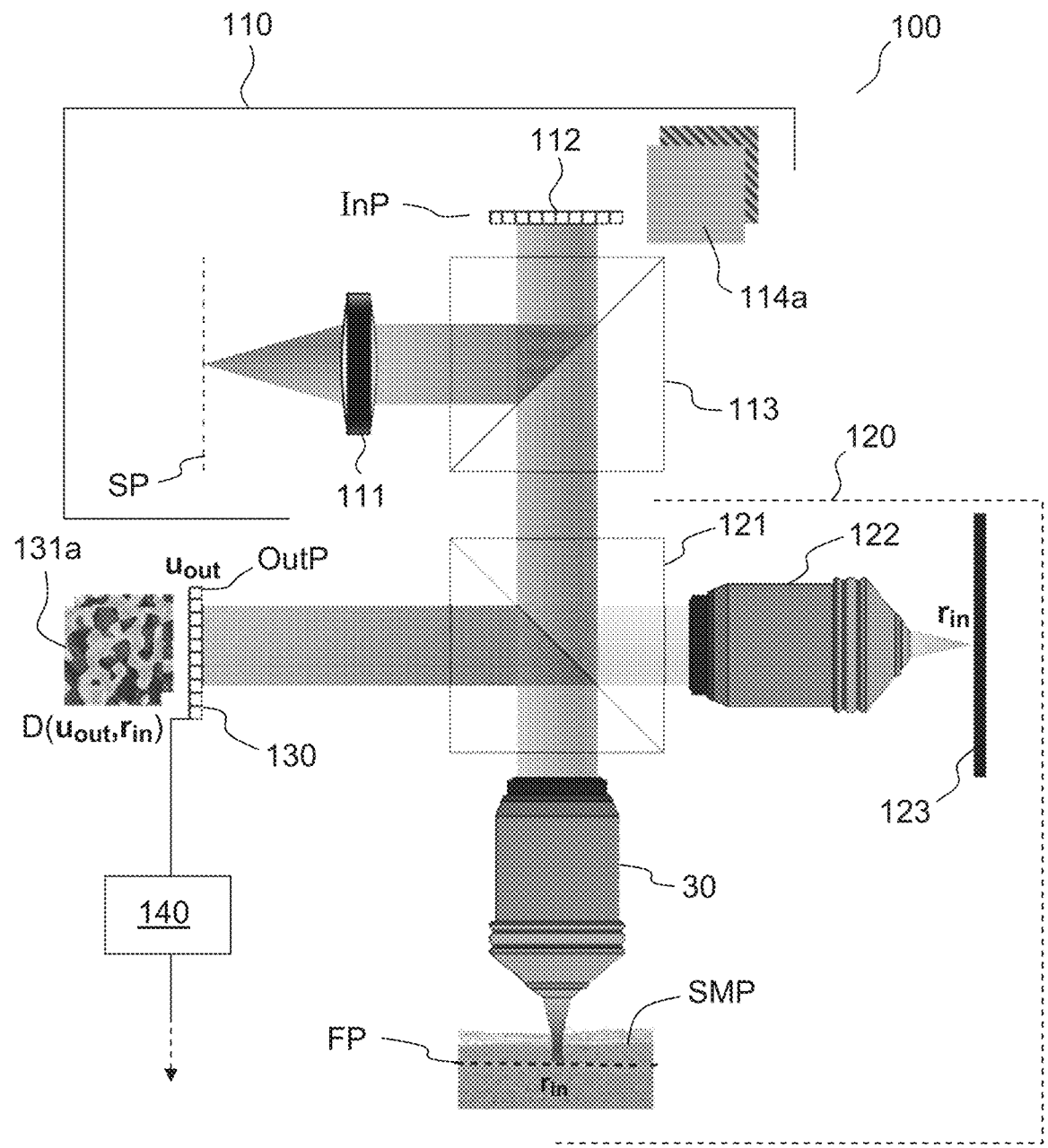
FIGS. 11A, 11B schematically illustrate a first example of a characterization system according to the present description (coherent illumination)
Figure 11B:
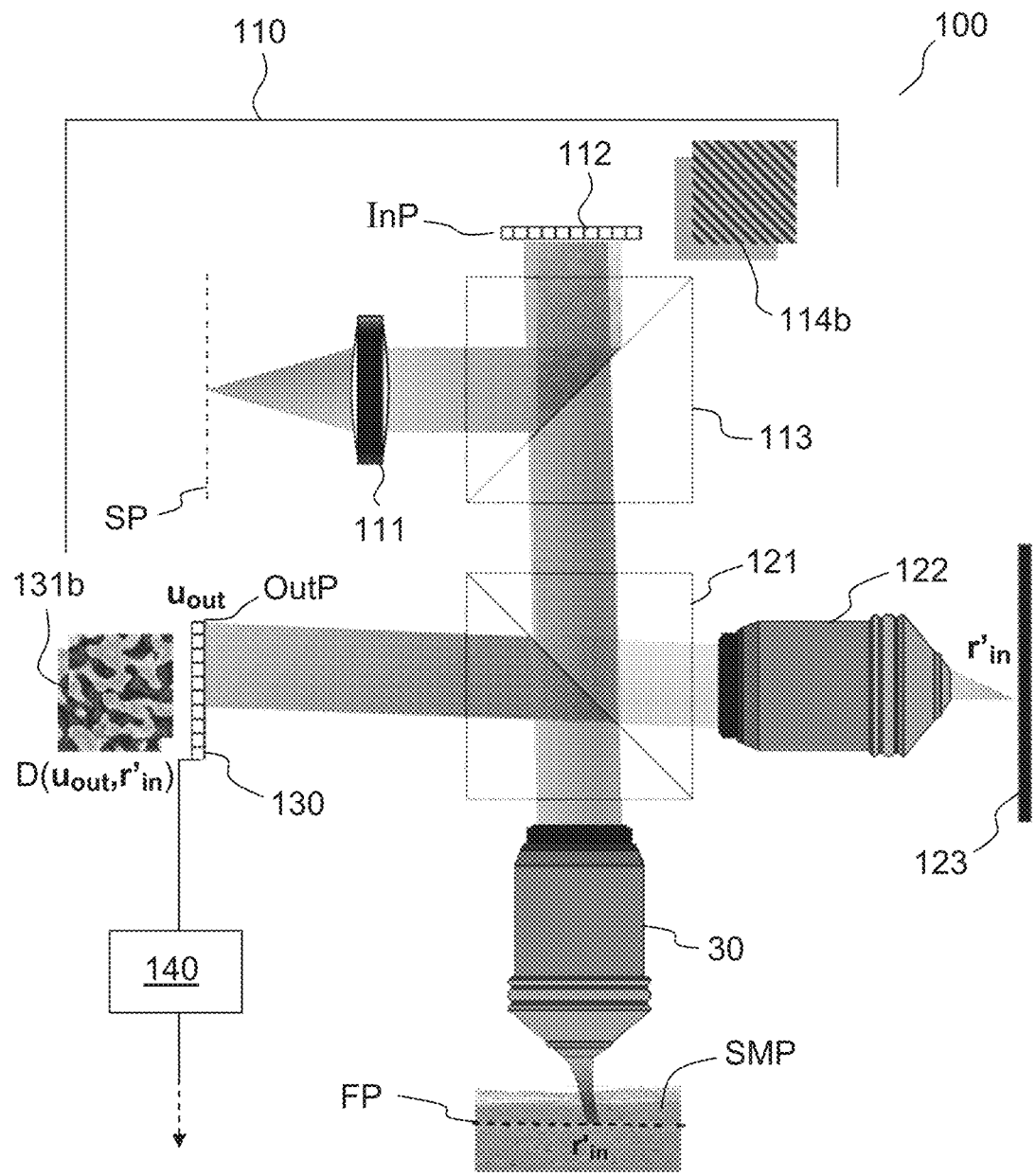
Figure 12:
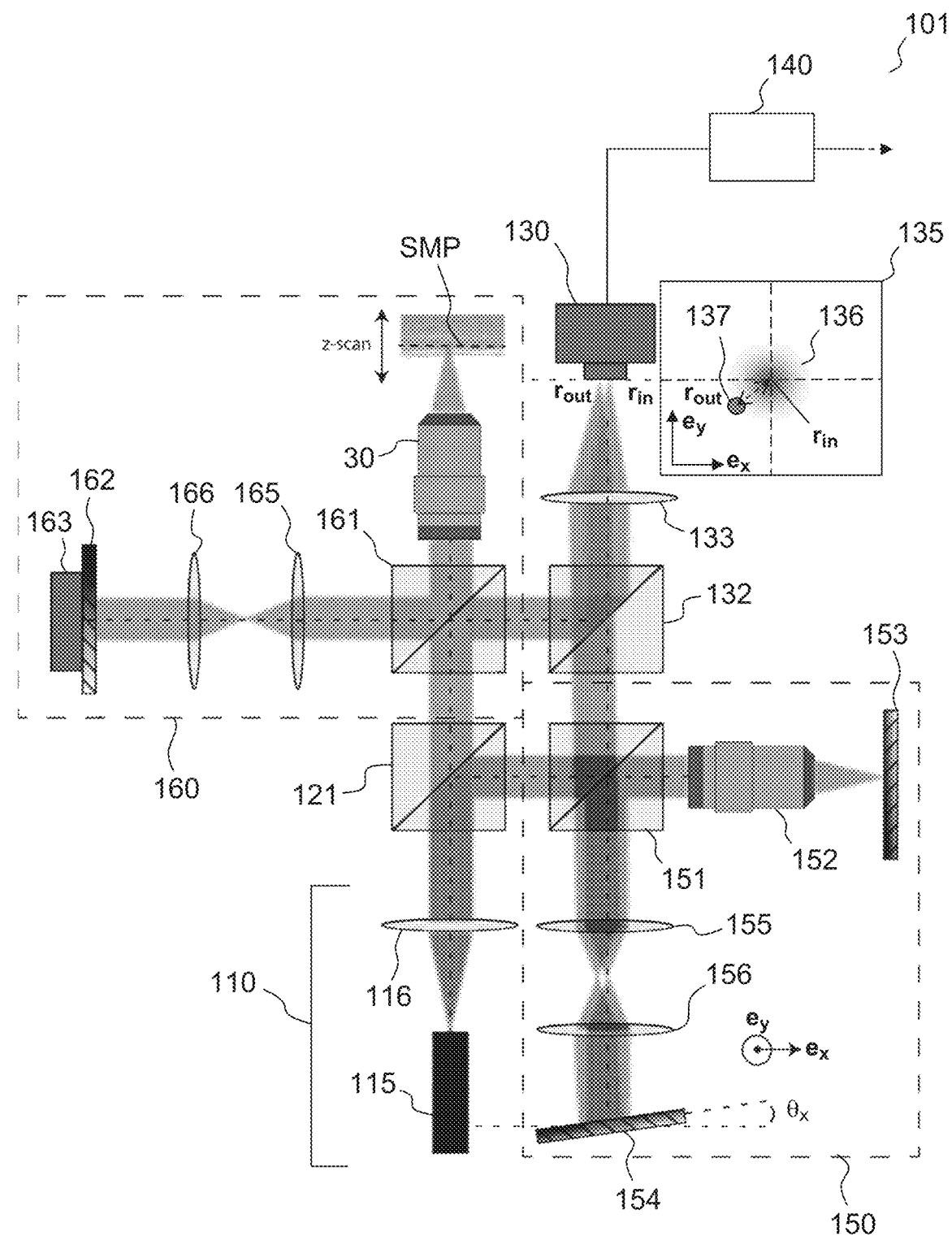
FIGS. 12, 13 illustrate other examples of characterization systems according to the present description (incoherent illumination)
Figure 13:
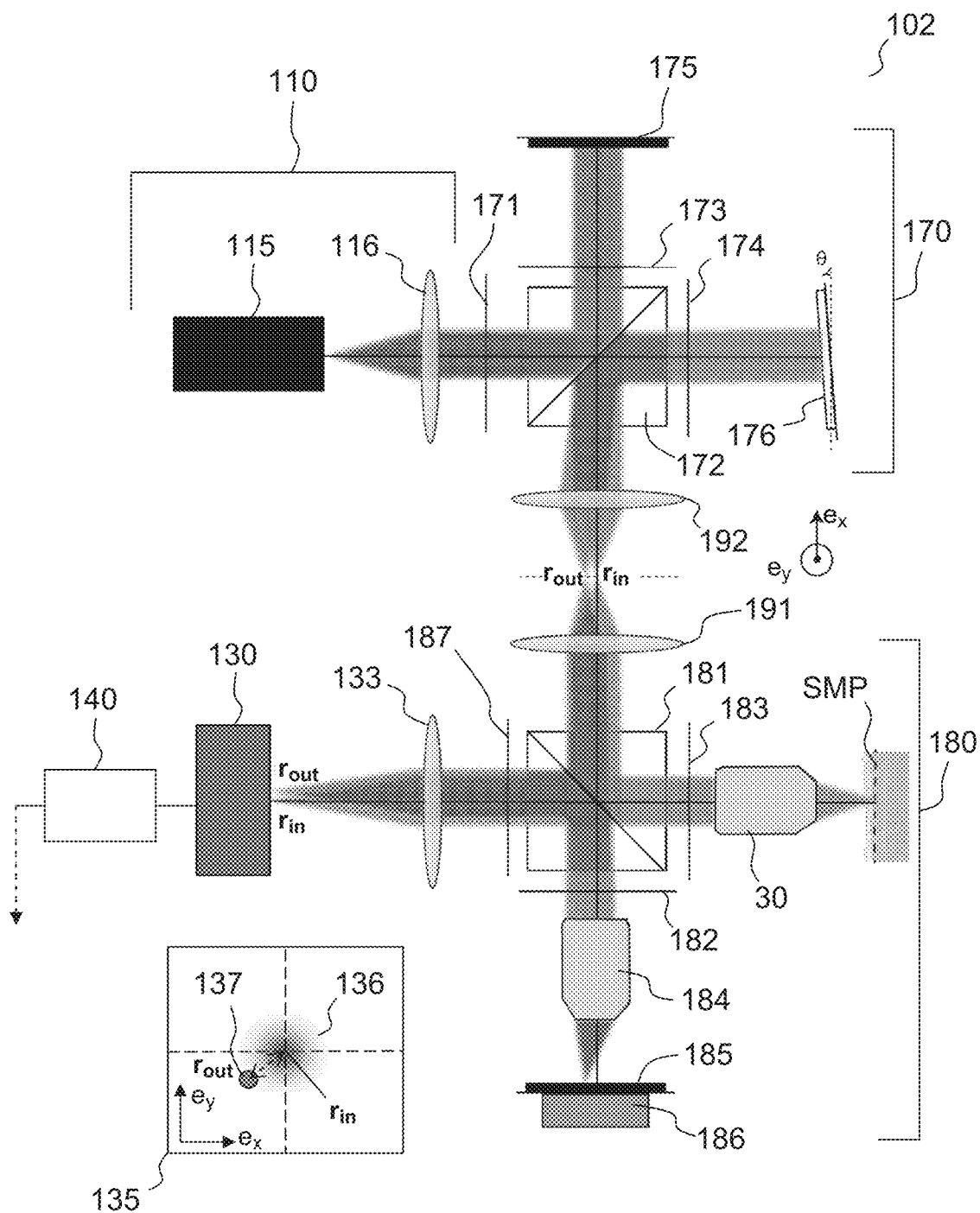

Exemplary setups are presented by means of FIGS. 11 to 13.

FIGS. 11A and 11B thus present a first exemplary embodiment of a system for the non-invasive optical characterization of a heterogeneous medium, allowing experimental determination of a distortion matrix. In this example, the light source is spatially coherent and the distortion matrix is measured in a basis defined between a source plane conjugate with the focal plane and an observation plane conjugate with a plane of the exit pupil OutP of the microscope objective. Of course, another observation plane could be chosen, as explained above.

More precisely, the system 100 shown schematically in FIGS. 11A and 11B comprises the microscope objective 30 which defines the focal plane FP in which the sample SMP formed of the heterogeneous medium is intended to be positioned.

The system 100 comprises a light emitting device 110 configured to emit a series of incident light waves intended to illuminate, through the microscope objective 30, a given field of view of the sample. More precisely in this example, the light emitting device 110 comprises a spatially coherent light source (not shown), for example positioned in an object focal plane or source plane SP of a lens 111 in order to illuminate a spatial light modulator (SLM) 112 by means of a beam splitter 113. The SLM acts as a dynamic diffraction grating and forms a set of plane waves that are intended to be focused at the same number of focus points $r_{in}$ of the focal plane of the microscope objective 30. Thus, FIGS. 11A and 11B illustrate, respectively, the formation by the SLM 112 of two plane waves, the phase of which is represented, respectively, by the images $114_a$, $114_b$ and which are intended to be focused at two focus points $r_{in,a}$ and $r_{in,b}$ of the focal plane FP of the microscope objective. The spatially coherent light source is advantageously a wide spectral band light source, for example a superluminescent diode or a femtosecond laser.

The system 100 further comprises an interferometric device 120, in this example a Linnik interferometer, a two-dimensional acquisition detector 130, for example a CCD or CMOS camera, and a computing unit 140 receiving in particular the optoelectronic signals coming from the detector 130.

The Linnik interferometer 120 comprises a beam splitter element 121 allowing the formation of an object arm and a reference arm. On the object arm is located the microscope objective 30 at the focal point of which the sample SMP is arranged. On the reference arm is located a second microscope objective 122, which may be identical to the microscope objective 30, and a reference mirror 123 arranged in a focal plane of the second microscope objective 122. The Linnik interferometer 120 is coupled to the light emitting device 110 in order to scan an incident wave focused in the focal plane of the microscope objectives 30 and 122. The interference between the beams coming from the object and reference arms is recorded (interferogram) for each focus point in the pupil plane of the microscope objectives using the two-dimensional acquisition detector 130.

For each focus point $r_{in}$, a plurality of interferograms are recorded for different positions of the reference mirror. By means of phase shifting interferometry [A. Dubois et al., "High resolution full field optical coherence tomography with a Linnik microscope, Appl. Opt. 41, 805 (2002).], the computing unit 140 reconstructs the cross-interference term between the complex electromagnetic field reflected by the sample SMP ($131a$, $131b$ in FIGS. 11A, 11B, respectively) and a reference wave; it corresponds to a column of the distortion matrix $D_{ur}$=[D ($u_{out}$, $r_{in}$)]. Specifically, by measuring the interference between the field coming from the object arm, $E_r(u_{out}, r_{in}, t)$, and the field coming from the reference arm, $E_r(u_{out}, r_{in}, t)$, in the pupil plane rather than in an image plane conjugate with the focal plane, the applicants have shown that it was possible to directly determine the distortion matrix $D_{ur}$:

$$D(u_{out}, r_{in}) = \int dt E_r(u_{out}, r_{in}, t) \times E_0^*(u_{out}, r_{in}, t+\tau) \quad (21)$$

If there is nothing between the microscope objective and the mirror, the reference medium is air. If gel is introduced between the microscope objective and the mirror, the reference medium will be a homogeneous medium with an optical index close to biological tissues.

The computing unit 140 is further configured in particular to determine, on the basis of said distortion matrix thus obtained, at least one mapping of a physical parameter of the heterogeneous medium forming the sample, as has been described in detail in the preceding examples. The computing unit 140 may be connected to a control unit (not shown) for controlling, in particular, the SLM, etc. The computing unit and the control unit may be integrated into the same device (computer).

The optical characterization system as illustrated in FIGS. 11A and 11B has the advantage of allowing experimental determination of the distortion matrix without prior determination of a reflection matrix, which makes it possible to save computing time, since the Hadamard product on the reflection matrix is performed physically and not numerically. There is also a gain in precision because the same degree of precision is not arrived at numerically in comparison with what is obtained by interferometry.

FIGS. 12 and 13 present two other exemplary systems for the optical characterization of a heterogeneous medium, also allowing the determination of a distortion matrix directly (without prior determination of a reflection matrix) and which also make it possible to omit focal plane scanning, which is necessary in the implementation of the system illustrated in FIGS. 11A, 11B.

The systems described in FIGS. 12 and 13 use spatially incoherent illumination (e.g. light-emitting diode, halogen lamp, etc.) and are derived from full-field OCT, as described for example in [A. Dubois et al., "High resolution full field optical coherence tomography with a Linnik microscope, Appl. Opt. 41, 805 (2002).].

To recall, full-field OCT as described for example in the reference mentioned above is based on the use of an experimental device comprising for example a Michelson interferometer with microscope objectives placed in its two arms (called the Linnik configuration). The interferometer illuminating device uses a tungsten-filament halogen lamp or a light-emitting diode (LED). By virtue of the very wide spectrum of this type of illumination, interference occurs provided that the path difference in the interferometer is very close to zero. The length of the reference arm of the interferometer determines, at the level of the sample to be imaged, a slice of thickness set by the width of the spectrum of the light source (typically 1 µm). Only the light reflected by the structures of the sample located in this slice creates interference. These structures may be imaged if the amplitude of the interference signal can be extracted. For this, a plurality of interferometric images are combined, which images are acquired by means of a CCD or CMOS matrix-array detector, and are mutually phase shifted by virtue of the oscillation of the reference mirror. Thus obtained is an image of the coherence volume in real time (rate of a few hundred hertz), that is to say the image of a thin slice oriented transversely. The transverse resolution of full-field OCT images is similar to that of images provided by a microscope, i.e. around 1 µm. The axial resolution is, for its part, much better than in conventional microscopy because it is set by the width of the spectrum of the light source and not by the depth of field of the microscope objective. One of the advantages of full-field OCT is being able to access an image of a slice of the medium in one measurement without having to scan the field of view as is the case in confocal microscopy for example. In full-field OCT, each pixel of the camera is conjugate with a point of the focal plane of the reference arm and a point of the focal plane of the object arm. It therefore measures the mutual coherence function between these two points. Since each focal plane is illuminated by an incoherent field both spatially and temporally, this mutual coherence function gives access to the impulse response (or Green's function) between these conjugate points. Each pixel of the full-field OCT image therefore corresponds to the impulse response that would be measured between a point source and a point detector placed at an identical position r in the source and image planes. Returning to the matrix formalism adopted in the present application, a full-field OCT type device thus allows simultaneous acquisition of all of the diagonal elements, $R(r_{in}, r_{in})$, of the reflection matrix $R_{rr}$ associated with the sample.

According to one exemplary embodiment of the present description, to access the entirety of the reflection matrix, the impulse responses are measured between distinct points of illumination no and detection $r_{out}$. For this, the fields coming from the object and reference arms of the interferometer are translated with respect to one another.

This is what is implemented in the original systems 101 and 102 shown in FIGS. 12 and 13.

The system 101 illustrated schematically in FIG. 12 comprises an illuminating device 110 capable of emitting a series of incident light waves that are intended to illuminate, through the microscope objective 30, a given field of view of the sample. In this example, however, the illuminating device 110 comprises, as in full-field OCT, a spatially incoherent light source 115, for example a tungsten-filament halogen lamp or a light-emitting diode, arranged, in this example, at the focal point of a lens 116 so as to form the incident light waves. In practice, homogeneous illumination is implemented, for example by means of a Köhler illumination system.

The system 101 comprises, as in full-field OCT, a low coherence interferometer with a beam splitter element 121 making it possible to split the incident wave coming from the illuminating device in the direction of a reference arm 150 and an object arm 160.

In the reference arm 150, the incident wave is first sent by a beam splitter 151 to a mirror 153 placed in the focal plane of a second microscope objective 152. The microscope objective 152 may be similar to the microscope objective 30. The wave reflected by the mirror 153 is then redirected using the beam splitter element 151 toward a mirror 154 conjugate with a pupil plane of the microscope objective 152 by means of an afocal 155, 156. The mirror 154 constitutes a principal inventive element of the device because its inclination will make it possible to spatially shift the reference beam on the camera.

The object arm of the device is symmetrical to the reference arm in order to obtain identical path differences. The incident wave is sent by a beam splitter element 161 to the sample SMP. The sample SMP and the mirror 153 are in optically conjugate planes. The reflected wave is then redirected by the beam splitter 161 to a mirror 162 conjugate with the pupil plane of the microscope objective 30 by virtue of the afocal 165, 166 and conjugate with the mirror 154 of the reference arm. Unlike the mirror 154 which may be inclined, this one is kept perpendicular to the optical axis.

Thus, at the exit of the reference 150 and object 160 arms, the waves reflected, respectively, by the reference mirror and the sample are spatially shifted, in a plane conjugate with the focal plane. The reflected waves thus formed are recombined by virtue of a beam splitter 132. A lens 133 makes it possible to cause them to interfere on a CCD or CMOS camera 130 placed in the image focal plane of the sample. A piezoelectric element (PZT) 163 placed on the mirror 162 makes it possible to extract the cross-interference term by acquiring interferograms for a plurality of values of the phase, for example three or more phase values, as described in the reference mentioned above for full-field OCT.

As shown in FIG. 12, the inclination of the mirror 154 causes the reflected beams coming from the reference and object arms to be spatially shifted with respect to one another in a plane conjugate with the focal plane. Unlike full-field OCT, it is thus possible to measure the impulse response between distinct points $r_{in}$ and $r_{out}$. Their relative position $r'_{out}$ is determined by the inclination of the mirror, $$r'_{out} = r_{out} - r_{in} = G \tan \theta_x e_x + G \tan \theta_y e_y \qquad (22)$$

where θx and θy are the angles of inclination of the mirror with respect to the axes borne by the unit vectors $e_x$ and $e_y$.

G=f'/f is the magnification of the system with f' being the focal length of the lens 133 placed in front of the camera.

The applicants have thus shown that, for each angle of inclination ($\theta_x$, $\theta_y$), there is recorded a subdiagonal of a matrix corresponding to the coefficients $R(r_{out}-r_{in}, r_{in})$ for a relative position $r'_{out}$ (equation 22) between the reference beam and the object beam. This measurement therefore amounts to directly measuring the distortion matrix in the focal plane since $D(r_{out}',r_{in})=R(r_{out}-r_{in},r_{in})$ (equation 4).

Each column of the matrix Dr in the focal plane corresponds to the focal spot $R(r_{out}-r_{in},r_{in})$ centered on the point of illumination $r_{in}$, i.e. the point spread function of the imaging device at the point $r_{in}$. The device presented in FIG. 12 therefore allows direct measurement of the distortion matrix in real space. As above, the reference medium is air unless a gel or another material which has an optical index close to biological media is introduced into the reference arm.

A simple Fourier transform of the matrix $D_{rr}$ then makes it possible to go into the exit pupil plane and obtain the matrix $D_{\theta r}$ in order to determine the isoplanatic domains of the field of view and the associated aberration laws, as explained above. Acquiring the matrix directly $D_{rr}$ affords a great advantage with respect to coherent measurement of the reflection matrix $R_{rr}$. Specifically, the number of measurement points required to acquire $D_{rr}$ is of the order of the number of resolution cells contained in the aberrated focal spot: $N_A=(\delta_A/\delta)^2$. It is independent of the size of the field of view. Conversely, the coherent approach requires a number $N=(FOV/\delta)^2$ focused illuminations. For typical aberration levels in biological media, the acquisition of $N_A$~10 images is sufficient to access the entirety of the distortion matrix using the incoherent setup of FIG. 12. Conversely, for a typical field of view of ~1 mm², it would be necessary to scan a field of view containing N=106 pixels with a coherent setup like those presented in the article by A. Badon et al. and that of Kang et al.

Another exemplary system for the optical characterization of a heterogeneous medium according to the present description is shown schematically in FIG. 13. The system 102 presented in FIG. 13 is more compact and more efficient in terms of signal-to-noise ratio than the system shown in FIG. 12.

The system 102 comprises, like in the example of FIG. 12, an illuminating device 110 comprising a spatially incoherent light source 115 arranged at the focal point of a lens 116 and suitable for emitting a series of incident light waves that are intended to illuminate, through the microscope objective 30, a given field of view of the sample SMP. The system 102 also comprises a two-dimensional acquisition device 130, arranged at the focal point of a lens 133 and a computing unit 140 receiving, in particular, the optoelectronic signals coming from the detector 130.

In this example, however, the system 102 comprises two interferometers placed in series. The first interferometer, reference 170, is for example a Michelson interferometer in air wedge configuration making it possible to generate, at its output, two illuminating beams inclined with respect to one another and with orthogonal polarizations. The second interferometer, reference 180, is for example a Linnik interferometer with a polarized beam splitter 181 as well as quarter-wave plates 182, 183 on each of the arms. An afocal system 191, 192 makes it possible to combine the planes of the mirrors 175 and 176 of the first interferometer 170 with the pupil planes of the microscope objectives 30 and 184 of the second interferometer 180.

The operation of this system will now be described in detail. The incident field, spatially and temporally incoherent, is first of all rectilinearly polarized at 45 deg in the parallel (e∥) and normal (e⊥) directions with respect to the plane of the device, by means of a polarizer 171. The components of this wave that is polarized along the directions e∥ and e⊥ are transmitted and reflected, respectively, by a polarized beam splitter 172. Each arm of the interferometer 170 contains a quarter-wave plate (173, 174) and a mirror (175, 176). On one of the arms, the mirror (176) is inclined with respect to the optical axis. On their return, the two waves coming from each arm exit the interferometer in the form of two orthogonally polarized inclined beams. These two beams are however coherent with respect to one other since they come from the same incident wave.

In the second interferometer, the two beams are again separated by the polarized beam splitter 181. The beam polarized along e∥ is transmitted in the reference arm. The beam polarized along e⊥ is reflected in the object arm. The presence of quarter-wave plates 182, 183 on each of the two arms makes it possible to transmit the two beams optimally once they have been reflected by the sample in the object arm and the mirror on the reference arm. These two beams are recombined at the output of the interferometer using an analyzer 187 polarized at 45 deg with respect to e∥ and e⊥. They may thus interfere in the focal plane of the lens 133. A CCD or CMOS camera records the corresponding interference pattern. As above, a phase shifting method, carried out using a piezoelectric element 186 attached to the mirror 182 on the reference arm of the interferometer 180, makes it possible to extract the interference term from the image recorded by the camera. As shown in FIG. 13, the inclination of the mirror 175 causes the reference and object beams to shift with respect to one other on the camera. Like for the setup above, the impulse response between distinct points $r_{in}$ and $r_{out}$ is thus measured. Their relative position $r'_{out}$ is determined by the inclination of the mirror according to equation 22.

FIGS. 14 to 16 show first experimental results obtained with a characterization system such as described in FIG. 12 and FIG. 17 shows experimental results obtained with a characterization system such as described in FIG. 13.

Figure 14B:
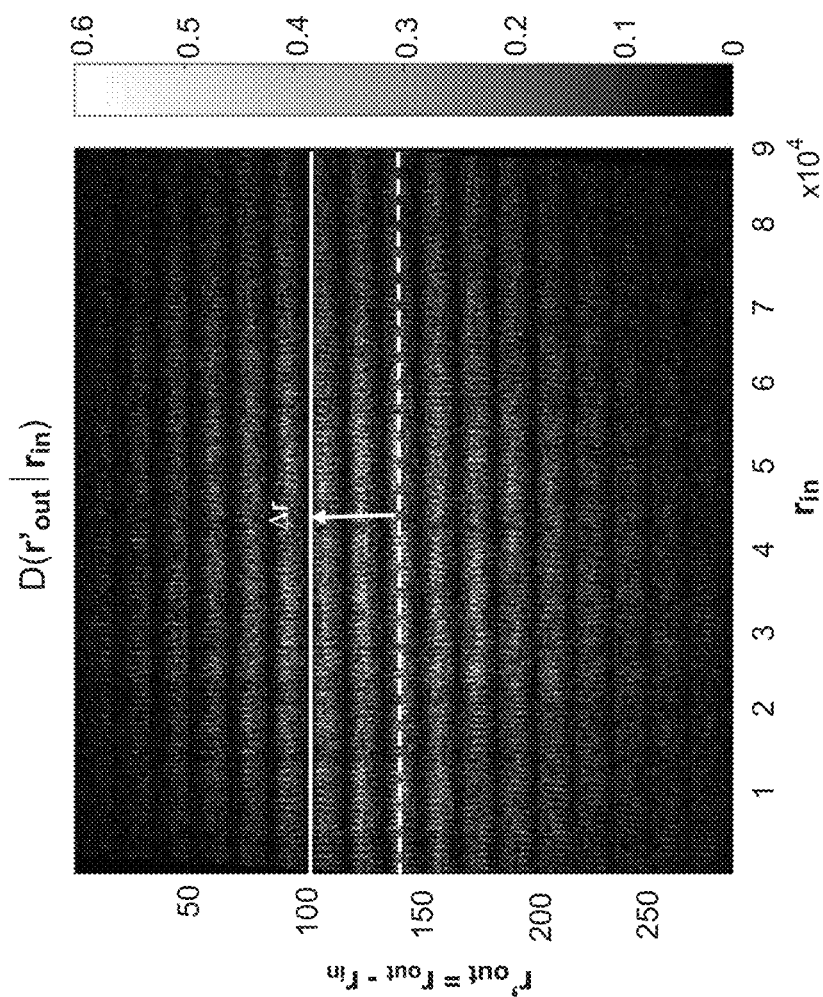
FIGS. 14A, 14B show a distortion matrix (FIG. 14B) obtained experimentally by means of an experimental setup of the type of FIG. 12 for a sample (resolution test pattern) observed through a diseased cornea (FIG. 14A)
Figure 14A:
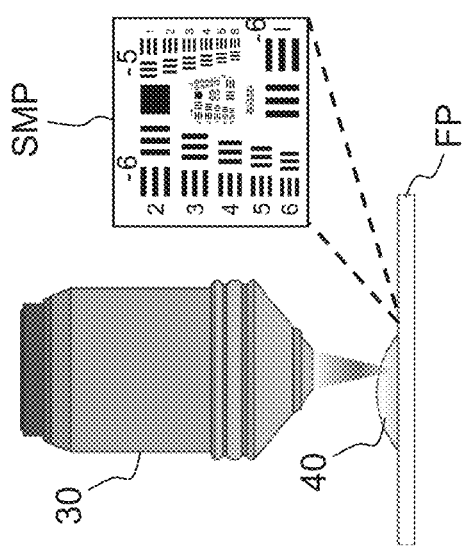

FIGS. 14 to 16 illustrate the results obtained for a test pattern (sample SMP) observed through an abnormal monkey cornea 40 (FIG. 14A). The test pattern is positioned in the focal plane FP of the microscope objective 30 (FIG. 12). The experimental device is that described in FIG. 12. The sample is imaged by means of a light-emitting diode (850 nm, 480 mW) through a microscope objective 4× over a field of view of 1.5×1.5 mm² with a spatial resolution of 5 μm (300×300 pixels). The distortion matrix $D_{rr}$ is obtained experimentally by measuring the point spread function for each point $r_{in}$ of the field of view over an area of 17×17 pixels, i.e. 289 acquisitions instead of the 90 000 that would have been necessary with the coherent setup of FIG. 2.

FIG. 14B illustrates the distortion matrix $D_{rr}$ measured using the setup of FIG. 12, according to the method described above.

From the distortion matrix $D_{rr}$ also shown in FIG. 15A, it is possible to determine the focal plane reflection matrix $R_{rr}$ by rearranging the data as indicated by equation (4). An en-face OCT image may be deduced from a central row of the matrix $D_{rr}$ while the point spread function at each point $r_{in}$ of the field of view corresponds to each column of $D_{rr}$. FIG. 15E shows the modulus of this point spread function averaged over the entire field of view. A two-dimensional spatial Fourier transform at the output of $D_{rr}$ gives access to the distortion matrix $D_{ur}$ (FIG. 15D) on the basis of which the aberration laws may be determined as described above.

FIG. 16A illustrates the aberration laws measured in the pupil plane (three first output eigenvectors $U_1$, $U_2$, $U_3$ shown in images (a), (b), (c)), respectively. The associated images in the focal plane, input eigenvectors $V_1$, $V_2$, $V_3$ are shown in images (a), (b), (c), respectively, of FIG. 16B. The point spread functions deduced from the corrected matrices $R_{rr}'$ and $D_{rr}'$ averaged over each isoplanatic domain are illustrated in images (a), (b), (c) of FIG. 16C. The OCT image (FIG. 16D) corresponding to the central row of $D_{rr}$ is compared with the image corrected by linear combination of the 10 first eigenvectors (image 16E).

This first example shows how the experimental devices of FIG. 12 or 13 allow direct measurement of the matrix Dr over millimetric fields of vision at micrometric resolution. It also shows how to simultaneously correct high-order aberrations giving rise to multiple isoplanatic areas in the field of view.

FIGS. 17A-17D illustrate the application of the method according to the present description to a second example, namely the deep imaging of a biological medium, still using an experimental setup of the type of FIG. 13. Unlike the first case which corresponded to a specular mode, in this instance it is an intermediate mode between specular and random scattering modes.

The biological sample imaged here is a tree leaf. The field of view is 2×2 mm² (400×400 pixels) and the focal plane is located at a depth of 70 μm with respect to the surface of the leaf (FIG. 17A).

FIG. 17B shows the "en-face" OCT image from the central row of the matrix $D_{rr}$ measured. This image suffers from poor contrast due to the break in optical index between the air and the leaf at its surface as well as to the aberrations caused by the leaf itself. Thus some veins of the leaf are difficult to see. Analyzing the distortion matrix gives access to a set of eigenvectors $V_i$, two examples of which, $V_2$ and $V_3$, are shown in images (a) and (b), respectively, of FIG. 17C. These two images show that the two eigenvectors are associated with different regions of the image. $V_2$ gives a contrasted image of the most reflective veins while $V_3$ gives a sharper image of the speckle in the background of the image. FIG. 17D is the corrected image obtained by linear combination of the fifteen first eigenvectors $V_i$ of the distortion matrix. The matrix correction for the aberrations gives a sharp and much more contrasted image of the section of the leaf, as evidenced by the comparison with the initial OCT image shown in FIG. 17B.

Like in the previous example, this example shows the feasibility of the method according to the present description, by means of an setup which allows, on the one hand, the acquisition of reflection and distortion matrices of large size and, on the other hand, the correction of high-order aberrations over millimetric fields of vision at micrometric resolution.

Although described through a number of detailed exemplary embodiments, the methods and systems for non-invasive optical characterization comprise different variants, modifications and refinements which will be obviously apparent to those skilled in the art, it being understood that these different variants, modifications and refinements fall within the scope of the invention, as defined by the claims which follow.

The invention claimed is:

1. A method for the non-invasive optical characterization of a heterogeneous medium, the method comprising:
a step of positioning said heterogeneous medium in a focal plane of a microscope objective, said microscope objective being located in an object arm of a first interferometer, said first interferometer further comprising a reference arm with a reference mirror;
a step of illuminating, by means of a series of incident light waves emitted by a light emitting device, said reference arm and a given field of view of said heterogeneous medium located in the object arm;
a step of determining a first distortion matrix in an observation basis defined between a conjugate plane of said focal plane and an observation plane, using a two-dimensional acquisition detector arranged in said observation plane and coupled to said first interferometer, said first distortion matrix corresponding, in a correction basis defined between a conjugate plane of said focal plane and an aberration correction plane, to the term-by-term matrix product of a first reflection matrix of said field of view, determined in said correction basis, with the phase conjugate matrix of a reference reflection matrix, defined for a model medium, in said correction basis; and
a step of determining, using a computing unit, on the basis of said first distortion matrix, at least one mapping of a physical parameter of said heterogeneous medium.

2. The method as claimed in claim 1, wherein the determination of said first distortion matrix comprises:
a step of determining said first reflection matrix in said observation basis;
calculating, using said computing unit, said first distortion matrix on the basis of said first reflection matrix and said reference reflection matrix defined in the same basis.

3. The method as claimed in claim 2, wherein said observation basis is the correction basis, and said first distortion matrix is constructed by the term-by-term matrix product of said first reflection matrix of said field of view determined in the correction basis with the phase conjugate matrix of the reference reflection matrix defined in the same basis.

4. The method as claimed in claim 2, wherein said observation basis is a focused basis defined between two conjugate planes of the focal plane, and said first distortion matrix is constructed by the spatial correlation between each row and/or column of the focused reflection matrix defined in said focused basis and the same row and/or column of the reference reflection matrix defined in the same basis.

5. The method as claimed in claim 1, wherein:
said illuminating step comprises illuminating the object arm and the reference arm of the first interferometer by means of identical, spatially coherent light waves;
said first distortion matrix is determined in said correction basis and the determination of the first distortion matrix comprises the following steps:
for each light wave incident at a point of the focal plane, acquiring, using said two-dimensional acquisition detector, in said correction plane, an interferogram resulting from the interference between the electromagnetic field reflected by said point and the electromagnetic field reflected by the reference mirror;
calculating, using said computing unit, said first distortion matrix, each column of the first distortion matrix corresponding, for an incident light wave focused at a point of the focal plane, to the electromagnetic field associated with the cross-interference term of said interferogram.

6. The method as claimed in claim 1, wherein:
said illuminating step comprises illuminating the object arm and the reference arm of the first interferometer by means of spatially incoherent light waves, the waves reflected by the heterogeneous medium and the reference mirror at the exit of the first interferometer exhibiting a spatial shift in a plane conjugate with the focal plane, the shift being variable;
said first distortion matrix is determined in a focused basis defined between two conjugate planes of the focal plane and the determination of said first distortion matrix comprises the following steps:
  for each spatial shift, acquiring, using said two-dimensional acquisition detector, in a conjugate plane of the focal plane, an interferogram resulting from the interference between said waves reflected by the heterogeneous medium and the reference mirror and spatially shifted;
  calculating, using said computing unit, said first distortion matrix, each row of the first distortion matrix corresponding, for a spatial shift value, to the electromagnetic field associated with the cross-interference term of said interferogram.

7. The method as claimed in claim 1, wherein the determination of at least one mapping of a physical parameter of said heterogeneous medium comprises:
  determining the invariants in said focal plane of said first distortion matrix, in order to identify at least one first isoplanatic domain in said focal plane;
  determining, for each first isoplanatic domain identified, a mapping of at least one first aberration law in said correction plane.

8. The method as claimed in claim 7, wherein the determination of the invariants in said focal plane of said first distortion matrix comprises a singular value decomposition of at least one of the matrices of the group of matrices comprising: said first distortion matrix, said first normalized distortion matrix, a normalized correlation matrix of said first distortion matrix.

9. The method as claimed in claim 7, further comprising determining, in said observation basis, a reflection matrix of said field of view corrected by said one or more first aberration laws.

10. The method as claimed in claim 9, further comprising:
  determining a second distortion matrix corresponding, in said correction basis, to the term-by-term matrix product of said corrected reflection matrix determined in said correction basis, with the phase conjugate matrix of said reference reflection matrix.

11. The method as claimed in claim 10, further comprising:
  determining the invariants in said focal plane of said second distortion matrix, in order to identify at least one second isoplanatic domain in said focal plane;
  determining, for each second isoplanatic domain identified, a mapping of a second aberration law in said correction plane.

12. The method as claimed in claim 1,
wherein the determination of at least one mapping of a physical parameter of said heterogeneous medium comprises determining, for at least one first isoplanatic domain identified, a first point spread function in said focal plane.

13. A system for the non-invasive optical characterization of a heterogeneous medium comprising:

a first microscope objective defining a focal plane in which said heterogeneous medium is intended to be positioned;
a light emitting device for emitting a series of incident light waves, which are intended to illuminate, through said microscope objective, a given field of view of said heterogeneous medium;
a two-dimensional acquisition detector arranged in an observation plane;
a first interferometer coupled to the light emitting device and to the two-dimensional acquisition detector, comprising an object arm with said microscope objective and a reference arm comprising a reference mirror at the focal point of a second microscope objective, said first interferometer being configured to form, at said observation plane, interferences between waves reflected by the heterogeneous medium and said reference mirror,
a computing unit, coupled to the two-dimensional acquisition detector, and configured to
  determine, on the basis of the interferograms resulting from said interferences, a first distortion matrix in an observation basis defined between a conjugate plane of said focal plane and said observation plane, said first distortion matrix corresponding, in a correction basis defined between a conjugate plane of said focal plane and an aberration correction plane, to the term-by-term matrix product of a first reflection matrix of said field of view determined in said correction basis, with the phase conjugate matrix of a reference reflection matrix, defined for a model medium, in said correction basis;
  determine, on the basis of said first distortion matrix, at least one mapping of a physical parameter of said heterogeneous medium.

14. The system for the non-invasive optical characterization of a heterogeneous medium as claimed in claim 13, wherein:
said light emitting device is configured to illuminate said object arm and said reference arm by means of identical, spatially coherent light waves;
the observation plane is an aberration correction plane and the two-dimensional acquisition device is configured to acquire, in said correction plane, and for each light wave incident at a point of the focal plane, an interferogram resulting from the interference between the electromagnetic field reflected by said point and the electromagnetic field reflected by the reference mirror;
the computing unit is configured to construct said first distortion matrix, each column of the first distortion matrix corresponding, for an incident light wave focused at a point of the focal plane, to the electromagnetic field associated with the cross-interference term of said interferogram.

15. The system for the non-invasive optical characterization of a heterogeneous medium as claimed in claim 13, wherein:
said light emitting device is configured to illuminate the entire field of view on said object and reference arms by means of spatially incoherent light waves;
the first interferometer is configured to form, at the exit of said first interferometer, waves reflected by said heterogeneous medium and said reference mirror, which are mutually coherent, and exhibit a spatial shift in a plane conjugate with the focal plane, the shift being variable;

the observation plane is a plane conjugate with the focal plane and the two-dimensional acquisition device is configured to acquire, in said observation plane, and for each spatial shift, an interferogram resulting from the interference between said waves reflected by the heterogeneous medium and the reference mirror and spatially shifted;

the computing unit is configured to construct said first distortion matrix, each row of the first distortion matrix corresponding, for a spatial shift value, to the electromagnetic field associated with the cross-interference term of said interferogram.

16. The system for the non-invasive optical characterization of a heterogeneous medium as claimed in claim 15, wherein:

the first interferometer comprises a first beam splitter configured to form said object and reference arms;

the reference arm comprises a second beam splitter configured to send said illuminating waves to said reference mirror and to a second mirror, said second mirror being arranged in a plane conjugate with a pupil plane of said microscope objective, and exhibiting a variable inclination with respect to an optical axis defined by the optical axis of the microscope objective;

the object arm comprises a third beam splitter configured to send said illuminating waves to said heterogeneous medium and to a third mirror, said third mirror being arranged in a plane conjugate with a pupil plane of said microscope objective, perpendicular to an optical axis defined by the optical axis of the microscope objective.

17. The system for the non-invasive optical characterization of a heterogeneous medium as claimed in claim 15, further comprising:

a second illuminating interferometer configured to receive said spatially incoherent light waves from the light emitting device and to form two polarized illuminating waves with orthogonal polarizations and exhibiting a spatial shift in a plane conjugate with the focal plane; and wherein said first interferometer comprises a polarization splitting element configured to send to the object and reference arms, respectively, each of said polarized waves with orthogonal polarizations and exhibiting a spatial shift.

* * * * *